Oct. 20, 1953 — H. ERNST ET AL — 2,655,838
CONTINUOUS AIM GUN CONTROL MECHANISM
Filed May 29, 1936 — 12 Sheets-Sheet 1

INVENTOR.
HANS ERNST
AMOS H. HAWLEY
BY
O.H.K. Parsons
ATTORNEY.

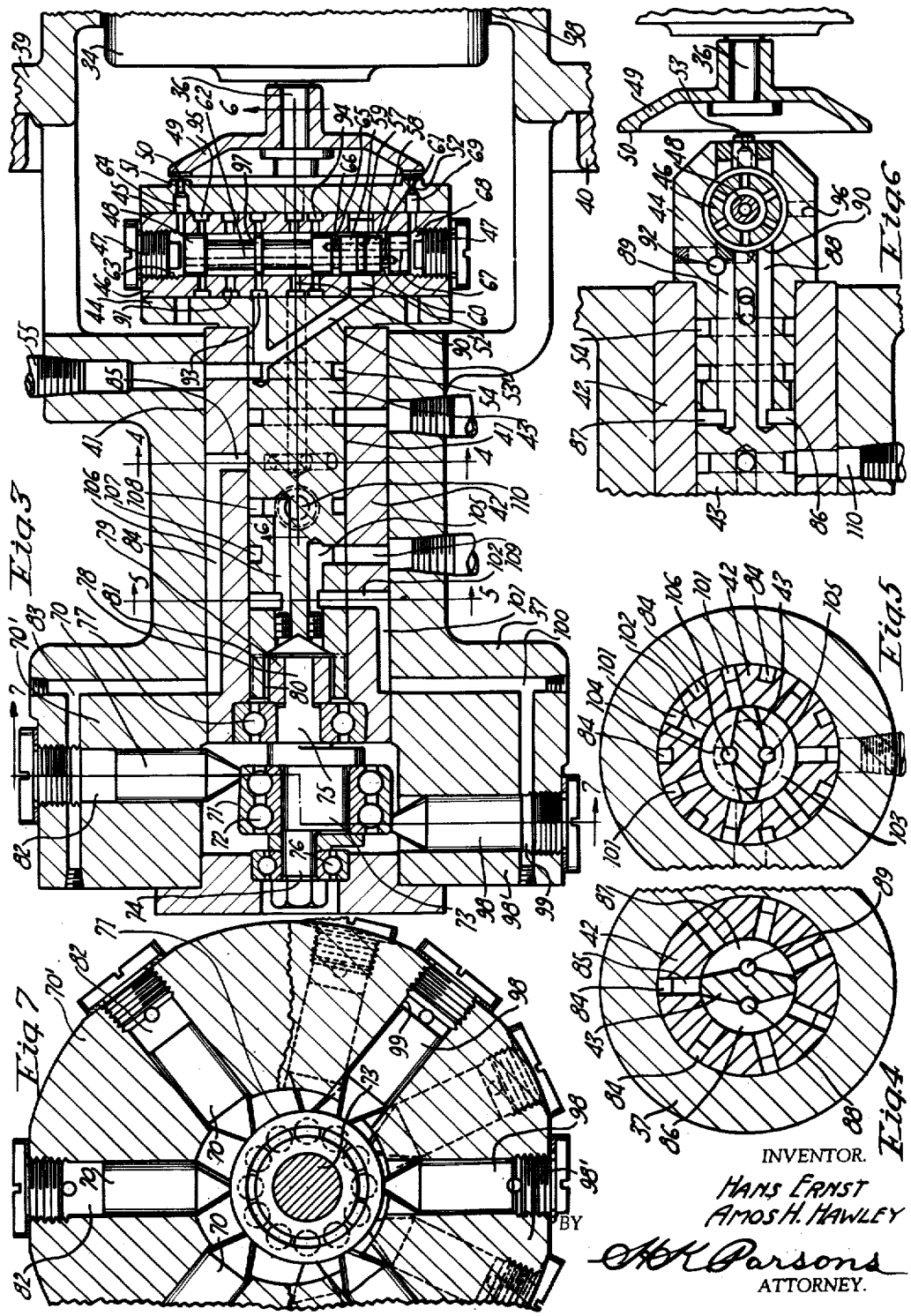

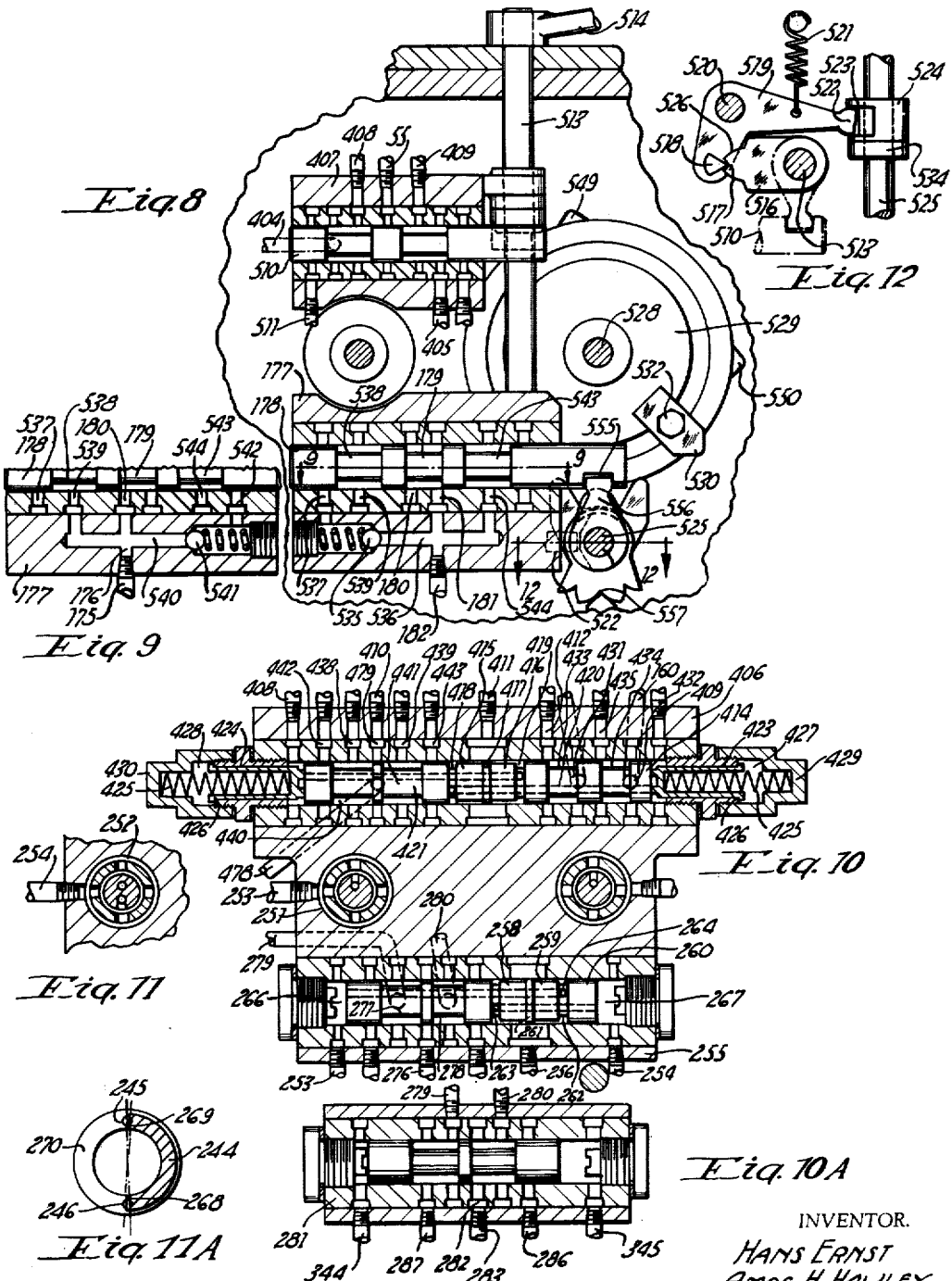

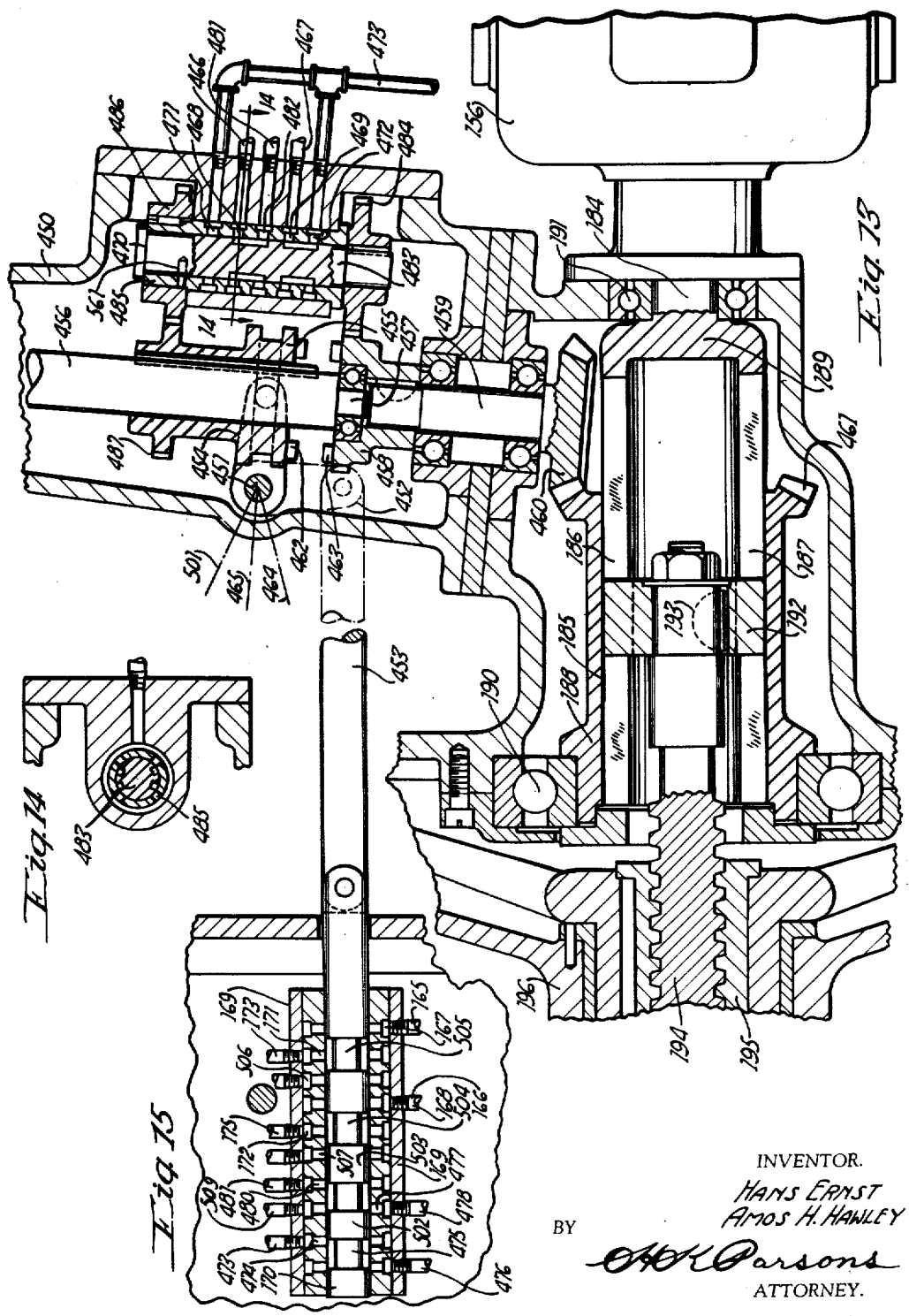

Oct. 20, 1953    H. ERNST ET AL    2,655,838
CONTINUOUS AIM GUN CONTROL MECHANISM
Filed May 29, 1936    12 Sheets-Sheet 6
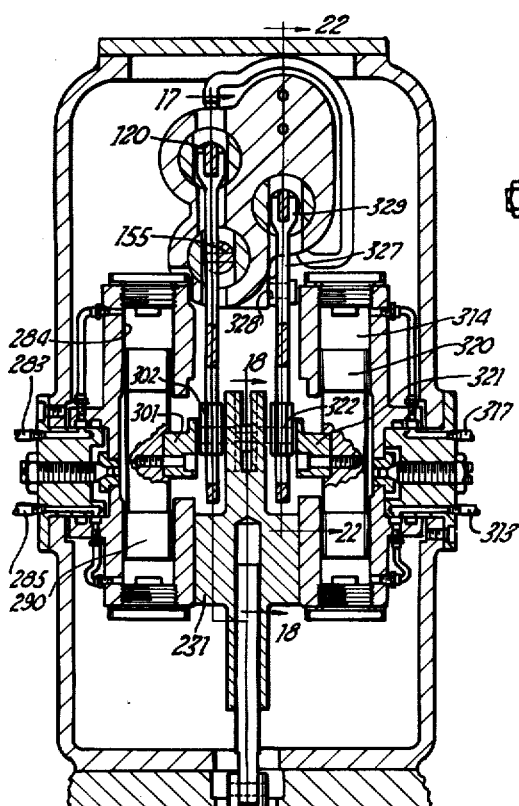
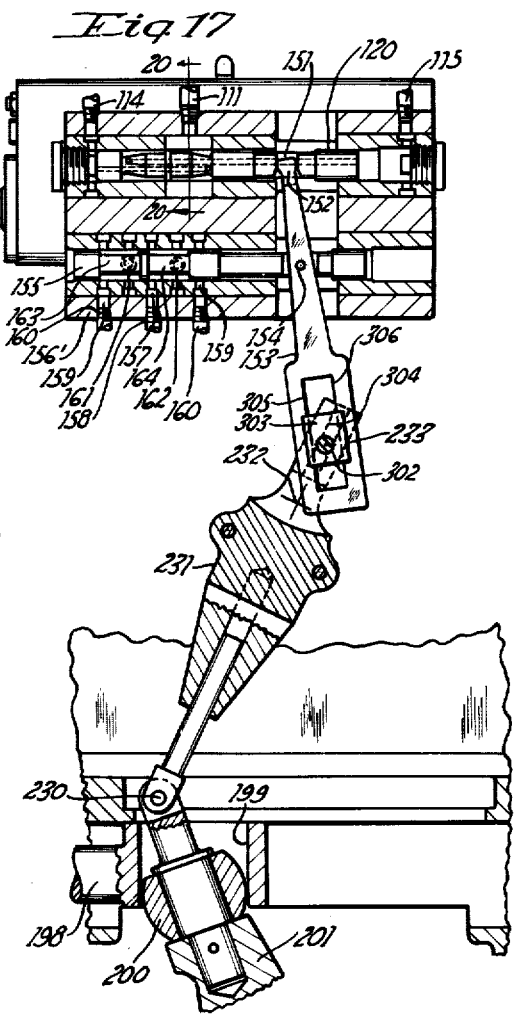
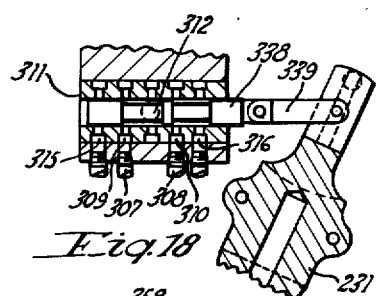
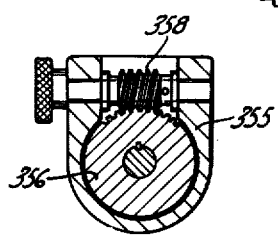
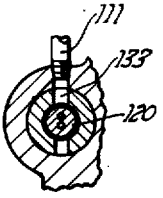
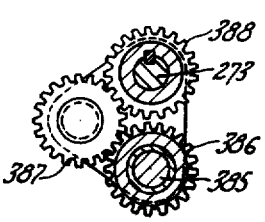
INVENTOR.
HANS ERNST
AMOS H. HAWLEY
BY
A. H. Parsons
ATTORNEY.

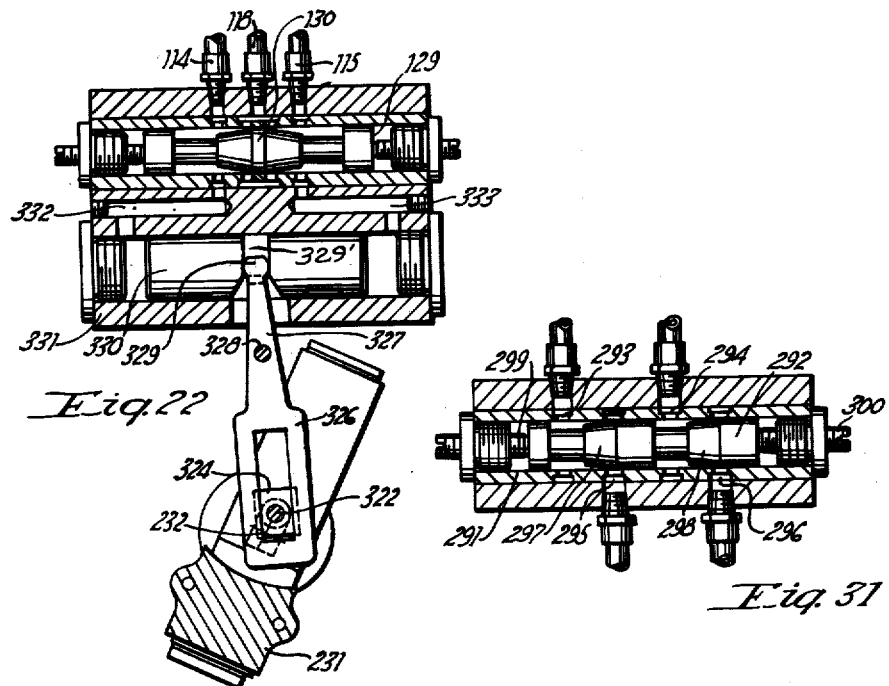
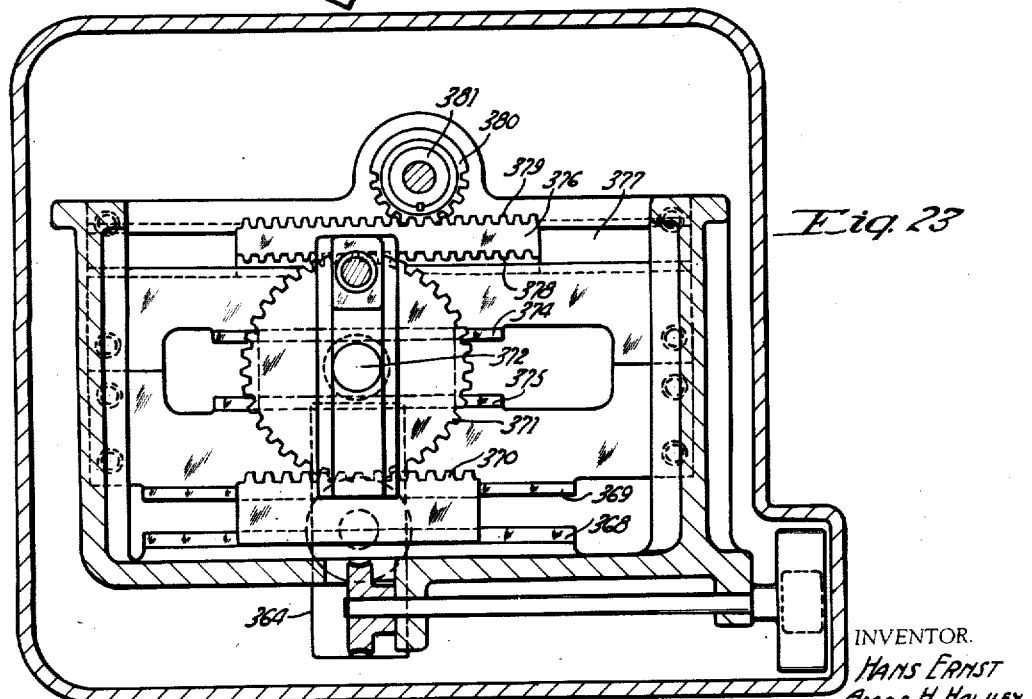

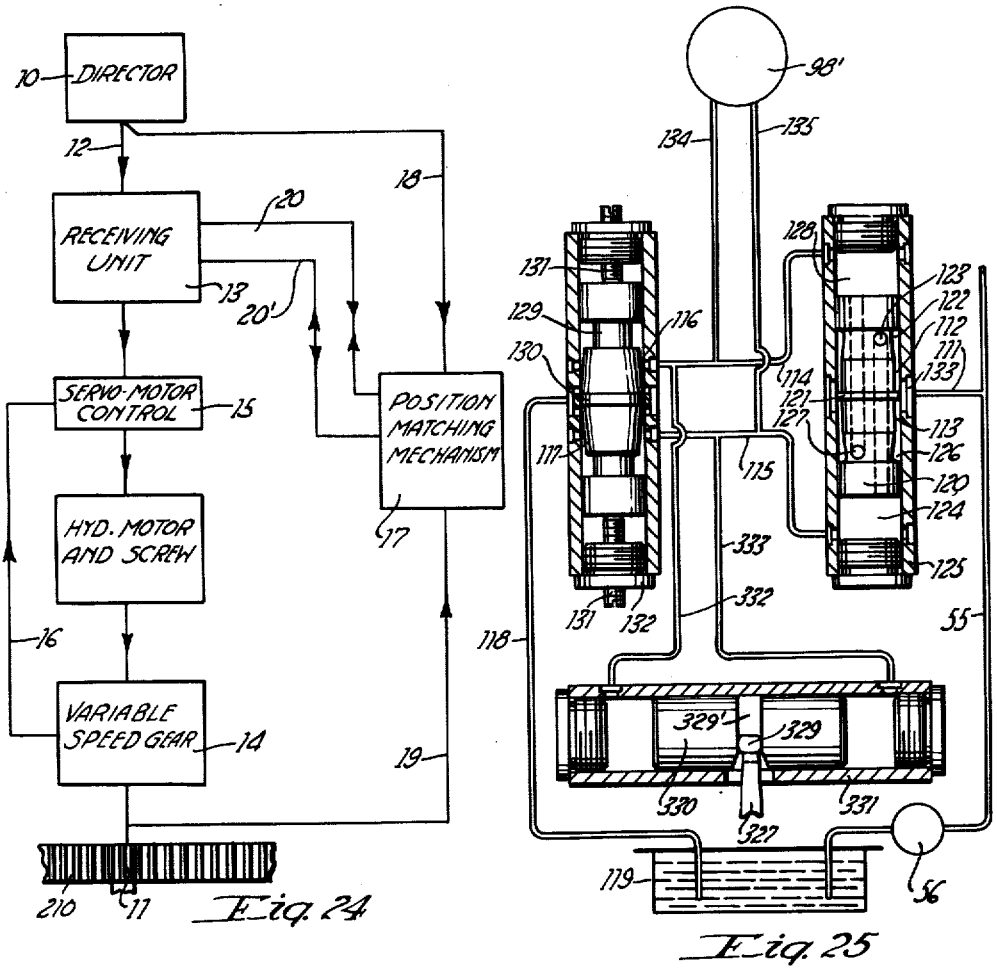
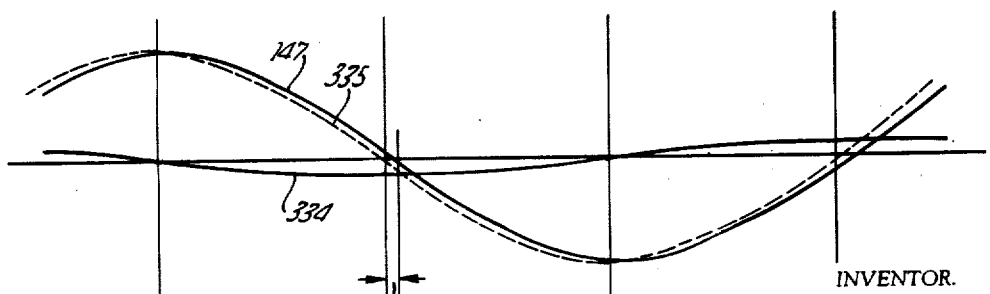

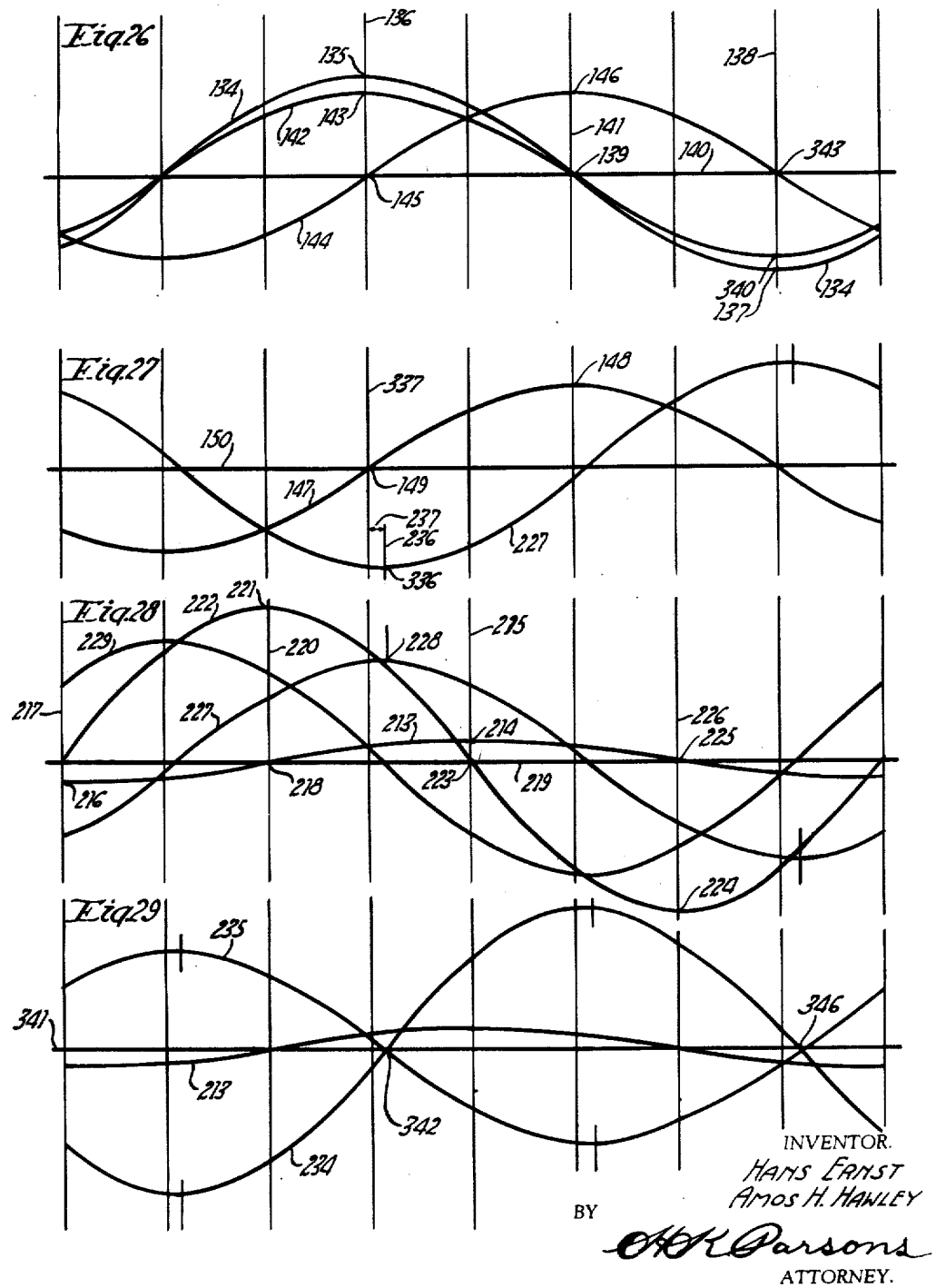

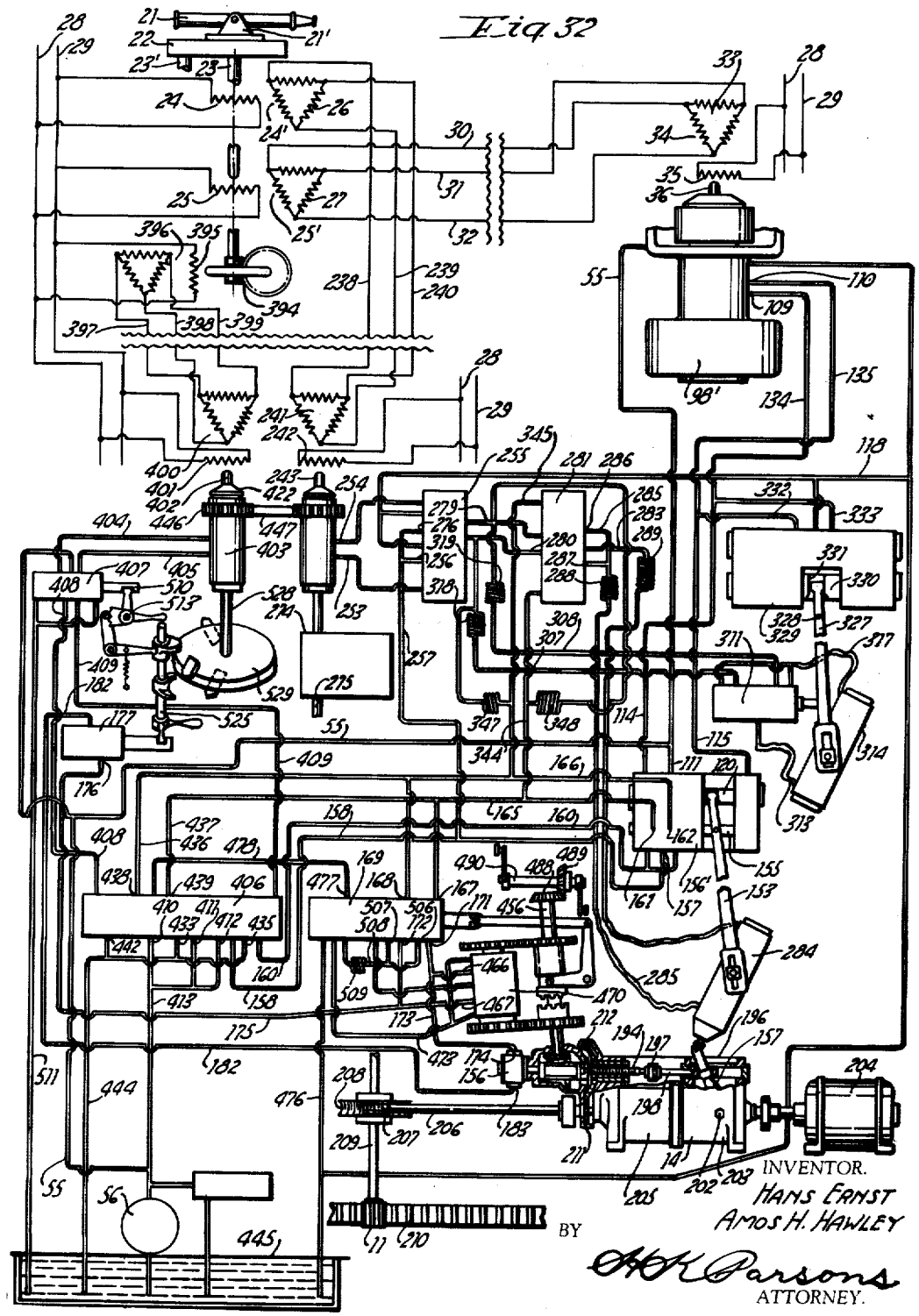

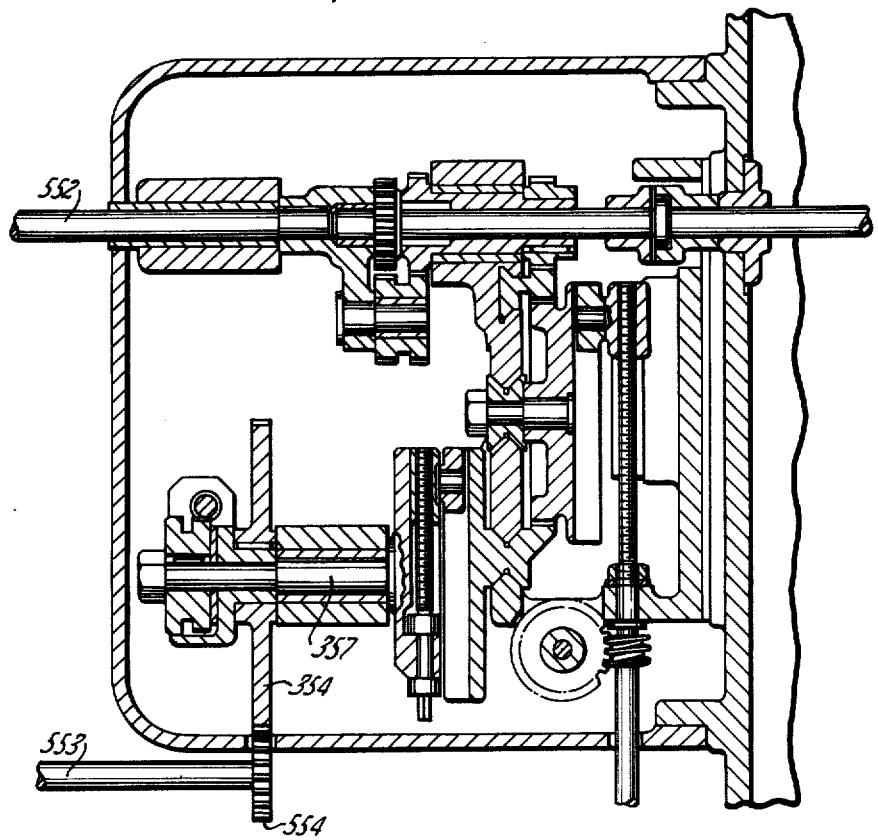
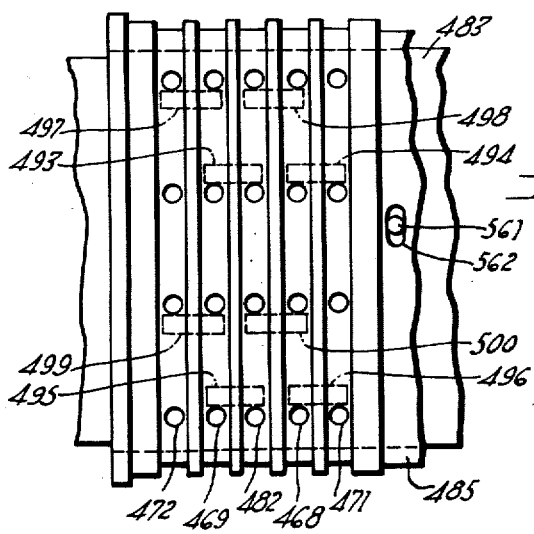
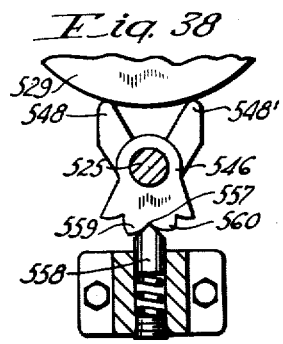

Patented Oct. 20, 1953

2,655,838

UNITED STATES PATENT OFFICE 2,655,838

CONTINUOUS AIM GUN CONTROL MECHANISM

Hans Ernst and Amos H. Hawley, Cincinnati, Ohio, assignors, by mesne assignments, to the United States of America as represented by the Secretary of the Navy Application May 29, 1936, Serial No. 82,580

40 Claims. (Cl. 89—41)

This invention relates to sensitive control mechanisms for use in connection with gun mounts for the purpose of controlling the pointing of a gun from a remotely located director.

Although mechanisms have heretofore been provided for interconnecting a director with a gun for remote control thereof, great difficulty has been encountered in maintaining the correct target pointing relationship between director and gun during the adjustment or relative movement thereof, as occasioned, e. g., by the roll of the ship. With certain of these devices, a correct positional agreement might have been obtained when the ship was relatively stationary, as when at the top or bottom of a roll, or when in calm water, but not while the motion was taking place.

In the attempt to maintain correct positional agreement by means of a mechanism responsive to a given relative angular movement of the director, thereby driving the gun through the same angle without overrun and without hunting, auxiliary devices, such as anticipating mechanisms, high powered brakes and anti-hunting mechanisms became necessary.

The present tendency in fire control mechanisms is to use stabilized directors mounted independently of the ship so that the gun and director are no longer responsive to ship roll in the same way, it being understood that the ship is considered as having continuous sinusoidal motion due to the sinusoidal motion of the sea waves. In other words, the directors, or the optical systems thereof, are gyroscopically balanced, which means that there is a continuous relative movement or oscillation between the director and ship.

If now, the ship is assumed to be stationary, then the director may be considered as a continuously moving element, which means that if the gun is to follow the director it must also be continuously moving with respect to the ship. Prior mechanisms, designed only on the principle of positional agreement without respect to the rate of motion, become inadequate for use with stabilized directors, due to the difficulties of lag and overrun which normally exist therein.

It is, therefore, an object of this invention to provide an improved means for maintaining continuous accurate aim of a gun mounted on an unstable carrier such as a ship, plane, or the like.

A further object of this invention is to provide improved coordination or punctuality of a gun with respect to its director in such a manner that the gun will substantially accompany the director at all times rather than follow it, thereby eliminating lag either during continuous movement or at reverse.

A further object of this invention is to provide a mechanism adapted to measure the speed of oscillation between a stabilized director and its supporting carrier and impart the desired proportion of that speed to the final actuator of a gun and thereby maintain the gun and director aimed at the same target.

A still further object of this invention is to provide a mechanism of the character set forth which will automatically correct for variations in phase and amplitude of gun movement with respect to director movement.

Still another object of this invention is to provide an improved mechanism for use in connection with a gyroscopic or otherwise stabilized director which will automatically correct the aim of a gun as it is disturbed by undesirable movements of the carrier upon which it is mounted, and which mechanism may also be utilized to effect deliberate changes in the aim of the gun in accordance with deliberate adjustments of the director.

Another object of this invention is to provide a mechanism of the character set forth which may be utilized either for controlling the training or the elevating of a gun and which includes master controls whereby the gun may be automatically synchronized with a new director as well as auxiliary devices for local manual control of the gun, either direct or through servo-mechanisms.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3 is a section on the line 3—3 of Figure 2.

Figure 4 is a section on the line 4—4 of Figure 3.

Figure 5 is a section on the line 5—5 of Figure 3.

Figure 6 is a section on the line 6—6 of Figure 3.

Figure 7 is a section on the line 7—7 of Figure 3.

Figure 8 is a section on the line 8—8 of Figure 2.

Figure 9 is a detail section on the line 9—9 of Figure 8.

Figure 10 is a section on the line 10—10 of Figure 2.

Figure 10A is a section on the line 10A—10A of Figure 2.

Figure 11 is a section on the line 11—11 of Figure 2.

Figure 11A is a section on the line 11A—11A of Figure 2.

Figure 12 is a section on the line 12—12 of Figure 8.

Figure 13 is an enlarged detail section showing the interconnection of the manual and power control means to the control screw of the variable speed hydraulic unit.

Figure 14 is a section on the line 14—14 of Figure 13.

Figure 15 is a section on the line 15—15 of Figure 2.

Figure 16 is a section on the line 16—16 of Figure 1.

Figure 17 is a section on the line 17—17 of Figure 16.

Figure 18 is a section on the line 18—18 of Figure 16.

Figure 19 is a section on the line 19—19 of Figure 2.

Figure 20 is a section on the line 20—20 of Figure 17.

Figure 21 is a section on the line 21—21 of Figure 2.

Figure 22 is a section on the line 22—22 of Figure 16.

Figure 23 is a section on the line 23—23 of Figure 2.

Figure 24 is a block diagram of the operating connections between the director and final actuator of one of the gun mechanisms.

Figure 25 is a view of the mechanism for measuring the speed of oscillation between the director and carrier and applying a correction thereto for variations in phase.

Figures 26 to 30 are views showing sinusoids which graphically depict movements of the various elements in the train of operating parts between the director and gun.

Figure 31 is an enlarged detail view of an adjustable double throttle valve.

Figure 32 is a general diagram of the entire control system.

Figure 33 is a view showing the connections to the roller path error correcting unit.

Figure 34 is a rolled out view of the servo-valve shown in Figure 13.

Figure 38 is a detail section on the line 38—38 of Figure 2.

Figure 1:
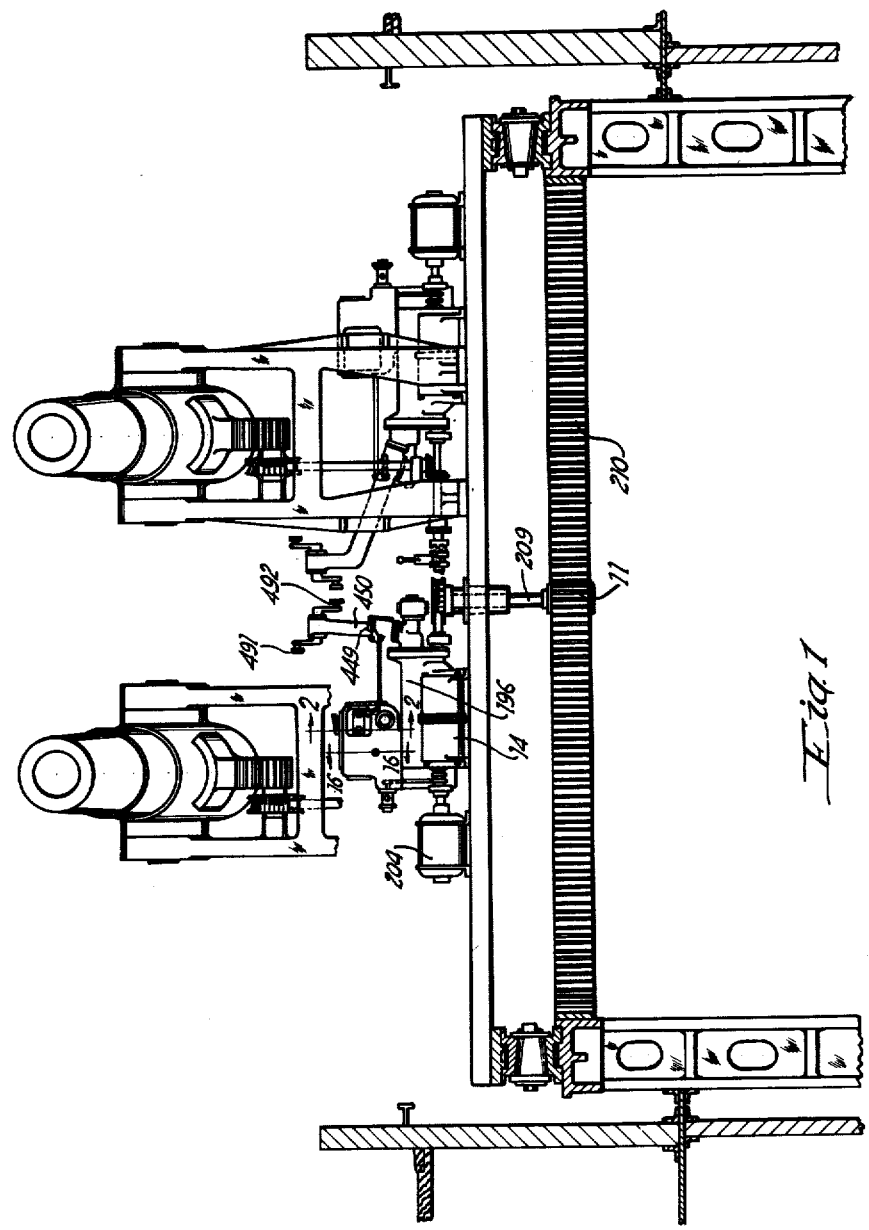
Figure 1 is an elevational view partly in section showing a general assembly of the mechanism involving the principles of this invention.

Prior to consideration of the specific details of this invention, a few preliminary matters should be discussed in order to understand more fully the particular office of this invention.

In the remote control of guns mounted on unstable carriers, such as ships, planes and the like, there is a so-called director unit which includes, among other things, an optical piece, by which the sighting or aiming is done, and an immediate support therefor which together may be termed herein as the director. The director is so mounted and supported as to be held in a horizontal plane, as by the use of gyroscopic or other means, whereby undesirable movements of the carrier, such as the pitch and roll thereof, will not be transmitted to, and thereby disturb the aim of, the director, whereby the director may be said to have continuous aim as respects these undesirable movements.

In addition, it should be pointed out that even although the director is thus stabilized in a horizontal plane means are provided whereby a portion of the director, such as the optical piece, may be deliberately adjusted in a vertical plane and the entire director deliberately adjusted in a horizontal plane, for the purpose of changing the aim.

The director unit also comprises two output shafts, one of which may be termed the elevating control element and the other the training control element, and these shafts are connected through mechanism contained in the director unit for response to all movements of the director, whether of the deliberate or of the undesirable variety as set forth above.

This connecting mechanism, which is of a complicated nature and forms no part of the present invention, includes various devices for introducing a number of corrections necessary to the proper determination of the final correct trajectory of the fired shell, and which are of such a nature that they are conventionally introduced at this point.

From this brief explanation it should be apparent that the director unit contains mechanism which acts to resolve the relative movements, whether undesirable or deliberate, between the carrier and the director into corrected motions of the two output shafts, which motions are in such form that they may be utilized without further change for control of the gun.

Since the final connection to the gun in both the elevating and training mechanisms usually involves a 36 to 1 reduction, the aforementioned connecting mechanism in the director includes a 1 to 36 step-up, whereby the motion of the output shafts is really the motion that is imparted to the final actuator of the training or elevating mechanisms. For positional purposes, to be described later, the output shaft is connected through a 36 to 1 reduction to a second shaft which is utilized for master control purposes.

The office of this invention is to measure the corrected speed of oscillation in both vertical and horizontal planes of the director relative to the carrier, whether occasioned by undesirable movements of the carrier, or by deliberate movements of the director, which corrected speed of the director is the same as the output shafts of the director unit, and to impart the same to the final actuators of the training and elevating mechanisms.

In order to simplify the explanation, the relative movement between the ship and the director will be referred to hereafter as the motion or movement of the director, because it is the initiating force or movement of the system.

Referring now to the specific features forming the subject matter of this invention, there is a main operating or speed matching circuit, which will be more readily understood by referring to the block diagram shown in Figure 24. In this figure the reference numeral 10 represents the director and the reference numeral 11 represents the final actuator which may be of either the training or elevating mechanism. It will be seen that the circuit includes a concatenation of devices with intervening connections, through which a power medium may be conducted, and these connections may be considered as constituting motion transmitting connections because they serve to transmit motion from the director to the gun in spite of the fact that the power may be amplified as it passes from one device to another.

This amplification, of course, is necessary if the small torque or force developed by movement of the director is to be transmitted through a distance and utilized to cause displacement of an unwieldy gun.

The speed matching circuit functions as follows: the angular motion or oscillation of the director is transmitted over the connection 12 to a receiving unit 13, which serves to measure the speed of angular movement of the director, and supervise the setting of a variable speed gear 14 for movement thereof at a suitable proportional speed, depending upon the ratio of the subsequent gear connection to the gun whereby the angular speed of the gun will be the correct function of the angular speed of the director. This supervision is effected through the medium of a servo-motor control unit 15 operable by the receiver to determine power rotation of the variable speed gear. A feed back 16 from the variable speed gear completes the servo-control.

The arrows indicate the direction of the flow of power. The feed back 16, and the infeed from the receiving unit are connected to a common member, whereby the speed of the output is matched with the speed of the input.

It is obvious that, due to the inertia of so many movable parts, and the sequential movements to be effected, a time lag is inherent and that the gun—although it may finally move at the corrected speed of the director—will do so at a later time with the result that the sinusoidal motion of the gun will be out of phase with the sinusoidal motion of the director, and furthermore, the amplitude of gun movement may also differ from that of the director.

It, therefore, becomes necessary to provide in parallel with the foregoing circuit, a position matching circuit comprising the detecting mechanism 17 having direct connections 18 and 19 to the director and gun respectively, whereby position differences between the director and gun may be immediately detected and utilized through connections 20 and 20' to apply a corrective effect to the receiving unit of the speed matching circuit in such a manner as to synchronize both the phase and amplitude of the two movements.

Thus the mechanism of this invention constitutes, in its simplest form, a power train through which energy is directed from the director to the gun to effect a rate of angular movement of the gun in accordance with the corrected rate of angular movement of the director; and means responsive to position differentials between director and gun to correct independently for both phase and amplitude, and all based on the principle that if the phase and amplitude of the sinusoidal motions of two objects are synchronized, the objects will necessarily move at the same speed, and in step with one another.

The specific construction of the speed matching circuit and its manner of operation will now be explained.

Referring to Figure 32, there is diagrammatically illustrated a gyroscopically balanced director, including the telescope 21 and its immediate support 21'. Since the details of the gyroscopic stabilizing system and the connecting mechanism heretofore referred to, and which includes the various connecting devices, form no part of the present invention, they are diagrammatically illustrated by the rectangle 22, from which emerge the output shafts, of which the shaft 23 may be considered as the training control element and the shaft 23' the elevating control element.

The entire control system shown in Figure 32 is illustrated as connected to the shaft 23 for training control and it is to be understood that a duplicate of this system is also connected to shaft 23'.

As previously explained, each of these shafts are rotated at a 36 to 1 ratio as respects gun movement, and each shaft drives, through a 36 to 1 reduction, a second shaft which operates a master control circuit.

Referring back to the speed matching circuit, the shaft 23 has attached thereto a pair of rotors on which are wound the field coils 24 and 25 of two self-synchronous electrical transmitters 24' and 25' which also have stator coils 26 and 27. The field coils are excited by a source of alternating current, represented by the power lines 28 and 29.

The stator coil 27 has a polycircuit connection through lines 30, 31 and 32 to the stator coil 33 of the self-synchronous receiver indicated generally by the reference numeral 34 of the speed matching circuit. This receiver has a rotor 35 attached to an output shaft 36. These self-synchronous devices operate on the principle that when the field coil of the transmitter is rotated relative to the stator coil an electrical disturbance is set up which is transmitted to the receiver causing rotation of the receiver rotor through the same angular movement that the transmitter rotor was moved. Since there is no appreciable lag in such a system, it will be apparent that the output shaft 36 will move in substantial unison with the input shaft 23.

Referring now to Figures 3, 4, 5, 6 and 7, there is shown a portion of the receiving unit 13 comprising a combination pump-motor unit, and power amplifying means, whereby the output shaft 36 of the self-synchronous receiver 34 may be utilized to control rotation of the motor. As the shaft 36 rotates, it causes synchronous rotation of the motor shaft which, in turn, causes the pump to operate and transfer fluid from one, of a pair of control lines, into the other thereof. It is to be remembered that the self-synchronous device 34 can develop very little torque, and therefore a form of power amplifying means has been provided which will operate in such a manner that it will not cause any appreciable load or resistance to the rotation of shaft 36. These various parts are supported in a housing 37 having an opening 38 at one end in which is mounted the synchronous device 34. The housing has a flange 39 by which it may be suitably secured to a support 40.

The housing 37 has a central bore 41 in which is fixed a sleeve 42 for supporting a rotatable member 43. This member has an enlarged head 44 in which is formed a cross bore 45 for receiving a sleeve 46, which is fixed against longitudinal movement in the bore. The ends of this sleeve are closed by threaded plugs 47 to form a chamber for a movable valve member 48. To the shaft 36 there is attached a dished highly sensitive rotor 49 which has an annular face 50 movable relative to ports 51 and 52 formed in the head 44. As shown in Figure 6, the upper portion of the face 50 is cut away to form shoulders 53. These shoulders are so located that they normally bisect the ports 51 and 52 so as to restrict the escape of fluid from the port, and in reality constitute a form of hydraulic resistance. When shaft 36 rotates, it varies the values of these resistances to cause actuation of the valve member 48, which in turn controls operation of an hydraulic motor.

In order to perfect this control, another pair of variable hydraulic resistances are provided, and these are formed on the valve member itself. The sleeve 46 has a pressure port 52' which is connected by a cross bore 53' to an annular groove 54 formed in the periphery of the rotatable member 43. This groove is continuously supplied with pressure from a channel 55 which may be connected to any suitable pump 56 as diagrammatically illustrated in Figure 32.

Opposite the port 52' the valve member 48 has a spool 57 formed thereon, and each end of the spool is slightly reduced in diameter at 58 and 59, whereby the fluid entering the pressure port will be divided and part will flow past portion 58 and the other part will flow past portion 59. When the spool 57 is central of port 52' the value of the hydraulic resistances created by the portions 58 and 59 will be equal.

Beyond the portion 58 there is formed an annular groove 60, which is connected by a cross bore 61 and longitudinal bore 62 to the chamber 63 formed at one end of the valve. This chamber is connected by a radial passage 64 to the port 51.

Similarly, beyond the portion 59 is formed an annular groove 65 which is connected by cross bore 66 and longitudinal bore 67 to the chamber 68 formed at the other end of the valve. This chamber communicates by means of a radial passage 69 to port 52.

Thus the fluid from the pump 56 divides at port 52', one portion flowing through the hydraulic resistance formed by the part 58, annular groove 60, and the interdrilled passages to chamber 63. The pressure in chamber 63 will be less than the pressure at port 52' due to the drop in pressure caused by the hydraulic resistance. This pressure will act on one end of the valve member 48, tending to shift the same. The fluid in chamber 63 will escape through the radial channel 64 to port 51, and a further drop in pressure will occur due to the hydraulic resistance at the shoulder 53.

The other portion of the fluid will flow through the hydraulic resistance formed by the portion 59, annular groove 65, and the interdrilled passages to chamber 68. The pressure in chamber 68 will be less than the pressure at port 52, because of the drop caused by the hydraulic resistance. The pressure in chamber 68 will act to shift the valve in an opposite direction, or in other words, against the pressure created in chamber 63. The fluid in chamber 68 will escape through the radial passage 69 and there will be a further pressure drop in the fluid escaping through port 52, due to the resistance at the shoulder 53.

It will now be seen that as the fluid leaves port 52' it passes through two parallel branches, in each of which is formed a pair of serially arranged hydraulic resistances with a pressure chamber intermediate said resistances. The hydraulic principle involved is that if each of one pair of serial hydraulic resistances has the same value, the pressure in the intermediate chamber will be one-half of the incoming pressure, or in other words, one-half of the pressure at port 52'. It will, therefore, be seen that if all four of the hydraulic resistances involved have the same value, the pressure in chambers 63 and 68 will each be one-half of the incoming pressure and therefore no movement will be imparted to the valve member 48, because the forces acting on opposite ends of it are equal. Assuming such a condition to exist, it will now be apparent that if the member 49 is rotated, the resistance to the escape of fluid at one of ports 51, 52 will be diminished and at the other will be increased, thereby changing the relative pressures in chambers 63 and 64 and thereby causing movement of the valve member 48.

This valve movement is utilized to control actuation and reversal of an hydraulic motor, and to this end the valve member 48 may shift in either one of two directions from the central position. It should also be noted that as the valve member shifts it changes the values of the hydraulic resistances at 58 and 59, and the valve will shift only far enough to equalize again the value of the first of the serial resistances in each pair, to the respective second serial resistance of each pair. When this occurs, the opposing pressures are again equal and the valve member will be held in a predetermined new position. When the hydraulic motor is energized, it bodily rotates the member 43 so as to reposition ports 51 and 52 in a central position relative to the new position of the shoulders 53, which thereby causes repositioning of the valve member 48 to stop actuation of the hydraulic motor. It will thus be seen that this operates after the manner of a servo-mechanism.

The hydraulic motor, indicated generally by the numeral 70', consists of a plurality of plungers 70 which are radially arranged, as shown in the upper part of Figure 7, and there are actually seven of these plungers, although any suitable number can be utilized. The ends of these plungers engage the periphery of an eccentric 71 which is anti-frictionally supported, as by balls 72, on an eccentric member 73 having bearing portions 74 and 75 formed on opposite ends thereof, and axially aligned with the axis of rotation of the rotatable member 43. The journals 74 and 75 are anti-frictionally supported in the housing 37 on bearings 76 and 77.

The journal 75 has a pair of axially extending lugs 78 which interfit in diametrically opposed slots formed in the periphery of an interconnecting ring 79. This ring has another pair of diametrically opposed slots 80 formed in the periphery thereof, but in 90 degree phase relation to the first pair of slots, into which fits a pair of lugs 81 projecting from the end of member 43. This form of driving connection permits small relative longitudinal and lateral movement between the parts, but the fits are such that there is no lost motion in the angular movement of the parts.

The end of each motor cylinder 82 is connected by an L-shaped passage 83 to a longitudinal groove 84 formed in the periphery of the sleeve 42. As shown in Figures 3 and 4, each groove terminates in a port 85 adjacent the periphery of the rotatable valve member 43. This member has a pair of grooves 86 and 87 constituting pressure and exhaust chambers, which are alternately connected upon rotation of the member 43 with different groups of ports 85, whereby one group of pistons 70 is subjected to pressure while the others are connected to exhaust.

A pair of longitudinally extending holes 88 and 89, Figure 6, connect the spaces 86 and 87, respectively, to ports 90 and 91 of the control valve. It will be noted from Figure 6, that the channel 88 is connected by a cross bore 92 to the port 91. The control valve has a pressure port 93, which is in communication with the supply line 55; and a pair of exhaust ports 94 and 95. Each exhaust port includes an annular groove which is intersected by a drilled hole 96, as shown in Figure 6, which communicates with the interior of the housing. A spool 97 substantially closes port 93 when the plunger 48 is in a central position, and additional spools spaced at opposite sides of the central spool substantially close ports 94 and 95. When the valve member 48 is shifted in either direction pressure from port 93 will be admitted to either channel 88 or 89, while the other is connected to exhaust to cause operation of the motor. Operation of the motor will cause rotation of the member 43 relative to the sleeve 42, as shown in Figure 4, and thereby act as a distributing valve to keep the motor in operation.

The motor 70' is utilized to actuate a pump generally designated as 98' which is combined in the same structure and comprises a plurality of pump plungers 98 which are alternately spaced with respect to the motor plungers, as shown in Figure 7, and which lie in a plane offset with respect to the plane of the motor plungers. The ends of the pump plungers contact the same eccentric member 71 so as to insure that all parts of the mechanism operate in timed relation with one another and thus prevent any lag in the system.

The end of each pump cylinder 99 is connected by an L-shaped passage 100, as shown in Figure 3, to a longitudinally extending groove 101 formed in the periphery of the sleeve 42, each groove terminating in a port 102, as more particularly shown in Figure 5. It will be noted that these grooves are spaced intermediate the grooves 84. The rotatable member 43 is provided with a second pair of oppositely positioned grooves 103 and 104 which serve as a distributor valve to alternately connect the ports to longitudinally extending bores 105 and 106. These bores terminate in annular grooves 107 and 108 respectively which are in constant communication with ports 109 and 110.

Thus, the motion of the director causes rotation or oscillation of shaft 23 and the connected rotors and coil 24 which sets up a reaction in the electrical circuit and causes a similar rotation or oscillation of shaft 36 remotely located with respect to the director. The disc 49 attached to shaft 36, causes, through the hydraulic amplification means, a shifting of a reversing valve which controls reverse operation of the motor 70'. The pistons of this motor act on the eccentric 71 to rotate the same, and rotation of the eccentric reciprocates the plungers of pump 98'. In addition, rotation of the eccentric causes rotation of member 43 and integral head 44, to cause a follow-up of ports 51 and 52 relative to the shoulders on disc 49 whereby a servo-action is produced to stop the motor 70' any time that the disc 49 stops. The pump 98' transfers fluid from one side to the other of a circuit now to be explained.

This circuit in elemental form is more particularly shown in Figure 25 and is similar in principle of operation to the circuit which controls the position of the reversing valve 48 shown in Figure 3. In other words, the pump 56 supplies fluid under pressure through a branch line 111 to a pair of hydraulic resistances indicated generally by reference numerals 112 and 113 from which the fluid flows in parallel lines 115 and 114 respectively to a second pair of hydraulic resistances, indicated generally by the reference numerals 116 and 117, and then through a common return line 118 to reservoir 119 whereby the fluid may be recirculated by pump 56. It is to be understood that fluid pressure is continuously flowing through this circuit in the manner just described during operation of pump 56.

The hydraulic resistances 112 and 113 are formed by slightly reducing the diameter of the valve plunger 120, adjacent opposite ends of a central spool 121. The fluid flowing through the hydraulic resistance 112 is collected in groove 122 and passes through a bore 123 to the chamber 124 located at one end of the valve housing 125 communicating with line 115. The fluid flowing through the hydraulic resistance 113 is collected in the groove 126 and passes through the bore 127 to the chamber 128 located at the other end of valve housing 125 and communicating with line 114.

The hydraulic resistances 116 and 117 may be formed by slightly tapered portions on the plunger 129 at opposite ends of the control spool 130. This time, the flow of fluid in the two lines is combined and delivered to a common return line. The plunger 129 is adjusted and held in a fixed position by adjusting screws 131 which are threaded in each end of the housing 132 containing plunger 129. By means of these adjusting screws the resistances 116 and 117 can be inversely varied so as to automatically adjust the position of plunger 120 and centralize spool 121 with respect to port 133.

Since the pressures in chambers 124 and 128 are equal, the plunger 120 will be held against movement. It will be evident, however, that if part of the fluid flowing in line 115 could be transferred into line 114, the pressure in the latter line would rise and the pressure in line 115 would drop, thereby causing a drop in pressure in chamber 124 and a rise in pressure in chamber 128. This, in turn, would cause the valve plunger 120 to shift because of unequal pressures on its ends.

This shifting movement would continue until the hydraulic resistances 111 and 113 have been inversely adjusted to increase the flow from port 133 to chamber 124 and decrease the flow from port 133 to chamber 128, until the pressures in these two chambers again became equal. Thus, the valve plunger 120 could be made to shift from its central position in either direction by transferring fluid from one of lines 114, 115 to the other.

Furthermore, the amount of this shifting movement would be in direct proportion to the rate of transfer of fluid. This basic circuit is therefore set up, and the lines 114 and 115 are connected by channels 134 and 135 to ports 109 and 110 of the pump 98', Figure 3.

It should now be evident that the oscillation of disc 49 in Figure 3, which is almost directly proportional to the oscillation of the ship, will cause, through hydraulic amplification means, oscillatory action of motor cylinders 70 on eccentric 73, which, in turn, will cause the pump 98' to transfer fluid alternately in opposite directions between lines 114 and 115.

Since all of these motions are sinusoidal in nature they may be plotted, and the curves shown in Figure 26 are graphical representations of these various motions. In this figure, the sinusoidal curve 134 represents the sinusoidal motion of the ship relative to the director. The point 135 on the ordinate 136 represents the extreme movement of the ship in one direction, and the point 137 of the ordinate 138 represents the other extreme movement of the ship. At the point 139 where the curve 134 crosses the abscissa 140 the rate of motion of the ship will be at its greatest.

It will be noted that the point 139 is halfway between the ordinates 136 and 138; and the ordinate 141, passing through this point, may be said to be spaced 90 degrees from ordinate 136 and 138.

Since the train of connections between the transmitter 25' and the metering pump 98' has substantially no lost motion in it, the motion of the metering pump is substantially in phase with the motion of the ship relative to the director and therefore a second sinusoidal curve 142 may be drawn in Figure 26 which is in phase with curve 134, although it may be graphically represented as having a different amplitude so that it may be distinguished from curve 134. At the point 143 where the curve 142 crosses the ordinate 136, the pump will be at one extreme of its motion and therefore will be on the point of reversing, at which time the delivery from the pump will be zero. If, then, another curve, such as 144, is added to Figure 26 to represent the rate of flow from the metering pump 98', this curve will cross the ordinate 136 at the point 145 because at this instant the rate is zero. This indicates that the sinusoid, representing the rate of flow from the pump, will be 90 degrees out of phase with the sinusoid representing the motion of the pump.

Furthermore, it will be seen that when the pump is traveling at its greatest rate as represented by the point 139, the output from the pump is greatest, which means that the curve 144 will intersect the ordinate 141 at 146.

It has also been explained, in connection with Figure 25, that the distance of the valve plunger 120 away from center is in direct proportion to the rate of transfer of fluid, and since the curve 144 in Figure 26 represents the rate of transfer of this fluid, then a curve may be plotted representing the motion of valve 120. This curve will be a sinusoid and is graphically represented in Figure 27 by the line 147. Since the rate of transfer of fluid is greatest at point 146 on the ordinate 141, so the valve 120 should at this instant be at one extreme end of its movement which can be indicated by the point 148 on the ordinate 141, and when there is no fluid being transferred, the valve will be in a central position for reasons previously set forth, and this will be indicated by the curve crossing the ordinate 136 at the point 149 where the ordinate intersects the abscissa 150. By comparison of Figure 27 with Figure 26, it will be seen that the motion of valve 120 is in phase with the rate of fluid transfer effected by the metering pump 98'. It will also be noted, by a comparison of these two figures, that the motion of valve 120 is 90 degrees out of phase with the motion of the ship as represented by curve 134.

Referring now to Figures 16, 17 and 32, the valve 120 has an intermediate reduced portion at 151 formed by flattening the sides of the plungers, so that a connection may be made with the forked end 152 of a floating link 153 which is the speed matching member. This link is pivotally connected at 154 to a servo-control valve plunger 155 which controls actuation of a rotary hydraulic motor 156, which, in turn, controls adjustment of the swash plate of a variable speed hydraulic unit 14, Figure 24. Movement of the swash plate changes the rate of output of the hydraulic unit, and thereby the rate of movement of the gun, and the plate has a central position in which the output of the unit is reduced to zero, and movement from one side to the other of this zero position changes the direction of movement.

As shown in Figures 17 and 32, the servo-control valve, which may be indicated generally by the reference numeral 156', has a pressure port 157 to which is connected a supply line 158. This valve also has a pair of return ports 159 which are connected to a return line 160. Intermediate the pressure port and the two exhaust ports, are ports 161 and 162 which lead to the hydraulic motor. The valve plunger 155 has a pair of annular grooves 163 and 164 formed therein which serve to alternately connect the pressure port 157 to one of the motor ports; and to connect the other of the motor ports to reservoir, thus controlling reversible operation of the hydraulic motor 156.

The ports 161 and 162 are connected by channels 165 and 166 to ports 167 and 168 of a selector valve 169. This valve is more particularly shown in Figure 15 and has a plunger 170 which is movable to three different positions, it being shown in a central position. When the mechanism is set for automatic operation, now under consideration, the plunger 170 is moved to the right of the position shown a sufficient amount to interconnect port 167 with port 171, and port 168 with port 172. Port 171 is connected by channel 173 to port 174 of the hydraulic motor 156. The other port 172 is connected by a channel 175 to port 176 of an emergency stop valve 177. The details of this valve are more particularly shown in Figures 8 and 9.

The stop valve has a plunger 178 in which is formed a cannelure 179 which, in the running position of the valve, interconnects ports 180 and 181 whereby the fluid may continue through the valve into channel 182. Channel 182, as shown in Figure 32, is connected to the other port 183 of the hydraulic motor 156. It should now be evident that with the selector valve and stop valve in the positions indicated, the servo control valve plunger 155 will directly control operation of the hydraulic motor 156.

As shown in Figure 13, the output shaft of the motor 156 is connected to shaft 184 which drives a tubular member 185, having longitudinal grooves or splines 186 and 187 formed lengthwise thereof. Anti-friction bearings 190 and 191 serve to support the member for frictionless rotation. The longitudinal slots 186 and 187 serve as guides for the relatively movable cross head 192. This cross head is keyed at 193 to the end of screw 194. The screw is threaded in a nut 195 which is held in the housing 196 against axial movement. The result is that upon rotation of the member 185 by the hydraulic motor 156, the screw 194 will be threaded through the nut 195, since the cross head 192 can move relative to the driving member 185.

As shown in Figure 32, the screw 194 is connected by a coupling 197 to the swash plate adjustment rod 198, which is guided for axial movement in the housing 196. As shown in Figure 17, the member 198 has an opening 199 formed therein for receiving the ball-shaped end 200 of the swash plate lever 201, whereby upon axial movement of the member 198 the swash plate will move about axis 202. The hydraulic unit, otherwise known as an hydraulic variable speed transmission gear, is old and well-known in the art and the operative principle may be the same as that shown in Patent No. 924,787, issued to R. Janney, and therefore further description is not believed necessary, except to state that the end 203 may be considered as the pump end which is continuously driven by the electric motor 204, and the end 205 may be considered as the motor end, which is directly connected to the output shaft 206.

The output shaft has a worm 207 operatively connected thereto and in operative engagement with a worm gear 208. The worm gear is supported on a shaft 209, which terminates in a pinion 11, meshing with the turret bull gear 210 in a 36 to 1 ratio. It will now be seen that rotation of the shaft 206 will, through the interconnecting gearing, effect rotation of the bull gear and thereby adjustment of the gun in train. Attention is also invited to the fact that the output shaft 206 of the hydraulic variable speed unit has a gear 211 attached thereto, which intermeshes with a gear 212 formed integrally with the nut member 195 whereby the nut is rotated in a direction to cause axial movement of the screw 194 in a direction opposite to which it is being urged by the motor 156. In other words, this is a form of servo-control whereby the motor 156 tends to move the swash plate in one direction; and the output from the hydraulic unit tends to return it to a central position. In order to maintain continuous movement, however, the screw must have a certain lead over the return movement from the unit output, and for the purpose of illustration a lead of approximately 45 degrees has been shown, but it is to be understood that this will vary under different operating conditions.

Since the valve member 155 controls the operation of the hydraulic motor 156 and thereby movement of the control screw, and since this, in turn, causes movement of the swash plate, whose position governs the rate and direction of operation of the feed back and thereby rotation of the nut, the relative movement of all of these parts may be considered for the moment independently of the rest of the circuit, and sinusoidal curves may be worked out to represent these various motions.

Since the valve member 155 is moved through the medium of the link 153 by the member 120 and since it has been shown that the member 120 has a sinusoidal motion it will be apparent that the member 155 will also move with a sinusoidal motion. Therefore, a sinusoidal curve 213 has been drawn in Figure 28, and the intersection of this curve at 214 with ordinate 215 indicates extreme movement of the valve 155 in one direction, and the intersection at 216 with ordinate 217 indicates extreme movement in the other direction, while the point 218, at which the curve crosses the abscissa 219, indicates a central position of the valve. Through these controlling points a sine curve may be drawn to represent oscillation of valve member 155.

Because we are assuming that this motion is continuous, it will be apparent that at the point where the curve crosses the abscissa, the hydraulic motor 156 will momentarily stop, because the valve member is in a central position and no flow is going to the motor. Since the screw 194 is directly connected to the motor 156, they may be considered together, and even although their motions are rotative they still may be considered as having definite limits, and when the curve of the valve 155 crosses the abscissa, as at point 218, the motor will stop and subsequently reverse, and this point may be considered as one end of the movement of the rotary motor and control screw. Therefore, on the ordinate 220 passing through the point 218, may be plotted a point 221 to indicate one end of the motion of the motor which, of course, will be a maximum when measured on the ordinate 220.

It will be apparent that when the valve member 155 reaches one end of its movement, as indicated for instance by the point 214, the motor will be traveling at a maximum speed because the valve is in a maximum opened position, and at this time the curve 222 will cross the abscissa at the point 223, which point will lie on the ordinate 215. As the valve member returns to its central position the motor will decrease in speed and will stop at the time that the valve reaches a central position, and this condition is indicated by the fact that the points 224 and 225 of curves 213 and 222 both lie on the ordinate 226.

Since the motion of the nut 195 is controlled by the motor 156 through the medium of the hydraulic unit, it will be apparent that if the motor 156 has an oscillating or sinusoidal motion, the nut will have a similar motion but since, as previously pointed out, there is a lag between the nut and the motor, a sinusoidal curve, such as 227, which may be added to Figure 28 to indicate the relative motion of the nut, will have a maximum or extreme movement at the point 228 which, for the conditions chosen for illustration, is approximately 45 degrees behind the motion of the motor. This will determine the location of the curve 227 relative to the curve 222 for the motor and thereby relative to the curve 213 for the valve.

Since the curve 222 represents the motion of the control screw 194, and the curve 227 the motion of the nut 195, and since the difference of these two motions is the motion of the swash plate lever 201, these two curves may be algebraically combined to produce a resultant curve which will represent the motion of the swash plate. Thus a curve 229 may be added to Figure 28 to indicate the motion of the swash plate.

Referring now to Figure 17, it will be seen that the free end of the swash plate lever 201 has a pivoted connection at 230 to an oscillatable member 231. This member is movable about an axis 232, and on the opposite side of this axis from the connection 230, the member 231 has a pivotal connection at 233 to the lower end of the floating link 153. The relationship of the relative motions of the various parts is as follows:

As the valve member 120, shown in Figure 17, moves, for instance, to the left of its center position, thereby moving valve member 155, the subsequent resultant effect causes the swash plate to move to the left of its center position and through the inerconnecting member 231 causes movement of the lower end of link 153 to the right, which thereby acts in a servo-relationship to return the valve member 155 to its central position. In other words, the pivot point 233 is always moving opposite to the movement of the valve member 120, tending to return the valve member 155 to a central position. The result of this is that the valve member 155 has actually very little movement, and even when in either one of its extreme positions it is only a few thousandths of an inch away from its central position. The construction of the valve 155 is such that this small movement is sufficient to cause operation of the motor 156 at its highest speed.

In Figure 28 the sine curve 229 can be considered to represent the motion of the pivot point 230 and thereby the motion of the lower end of member 231. It therefore follows that the point 233, which is on the opposite side of the pivot point 232, will have a similar motion, but the amplitude of this motion will be considerably less due to the difference in length between the lever arm of the point 233 with respect to the center 232; and the lever arm of the point 230 with respect to said center.

Also, since they are always moving in opposite directions, the movement of point 233 will have a 180 degree phase difference with respect to the movement of the point 230. Considering therefore the difference in length of the lever arms and the phase difference, a curve may be plotted representing the motion of point 233. Such a curve, represented by the reference numeral 234, has been drawn in Figure 29 and it will be noted that it is so positioned as to be opposite in phase to the curve 229.

The curve 213, representing the motion of valve member 155, may be superimposed on Figure 29, and since these two curves represent the motion of two different parts of the floating link 153 and since these two motions are known, a resultant curve 235 can be produced which will represent the motion of the end 151 of lever 153, and this resultant curve should correspond to the curve 147 shown in Figure 27.

If the curve 235 is now superimposed on curve 147 it will establish the phase relationship between all of the curves in Figures 28 and 29 relative to the curves in Figure 26 and thereby show the phase relationship between the curve 227, which may be considered as representing the motion of the gun relative to the ship, and the curve 134 which represents the motion of the ship relative to the director, whereby it may be determined whether these two curves are in phase or not.

The motion of the end 152 of lever 153, represented by curve 235 in Figure 29, is really the differential produced by the movements of points 154 and 233, and since the lengths of the lever arms of the different points are some of the determining factors, the curve 235 cannot be found simply by adding or subtracting curves 213 and 234, but resort must be had to a formula involving the lengths of the different lever arms. If we let $L_1$ equal the length of the arm between point 233 and point 154 of lever 153, and $L_2$ the length of the arm between point 154 and the end 152 of lever 153, then it can be mathematically proven that the movement of end 152

$$= \frac{A(L_1 \text{ plus } L_2)}{L_1} - \frac{B \times L_2}{L_1}$$

where $A$=movement of point 154
$B$=movement of point 233

By measuring the ordinates of curves 234 and 213 at the several points, the movements of points 223 and 154 may be found respectively, and by multiplying each of these by the fractions indicated in the formula and performing the necessary algebraic operations the curve 235 may be found. Attention is invited to the fact that the curve 213 is out of scale with respect to the remaining two curves, but this was done to increase the ordinates for the curve 213 in order to clearly show the controlling points of the curve.

Since the curve 235, as found in Figure 29, corresponds to the movement of the valve 120, and since the curve 147, as developed in Figure 27, also corresponds to the movement of valve 120, these two curves may be superimposed and thereby show the phase relationship of the curve 227 relative to curve 134. For the purposes of this comparison, the curve 227 has been redrawn in Figure 27 in proper phased relation to curve 147 and it will be noted that the point 236 on this curve has a small lag relative to the ordinate 136 which lag is indicated by the reference numeral 237, in addition to the 180 degree phase difference between the two curves. The 180 degree phase difference is correct because the transmitter rotor 25, shown in Figure 32, moves with the ship, and the gun must be moved in opposite phased relation to the ship in order to maintain a given position.

It will now be seen that with the apparatus thus far described the gun, although fully responding to every movement of the ship, relative to the director, will yet have an inherent lag.

In order to overcome this lag a position matching system has been provided which will measure the amount of the lag and apply a corrective factor to nullify it.

Figure 2:
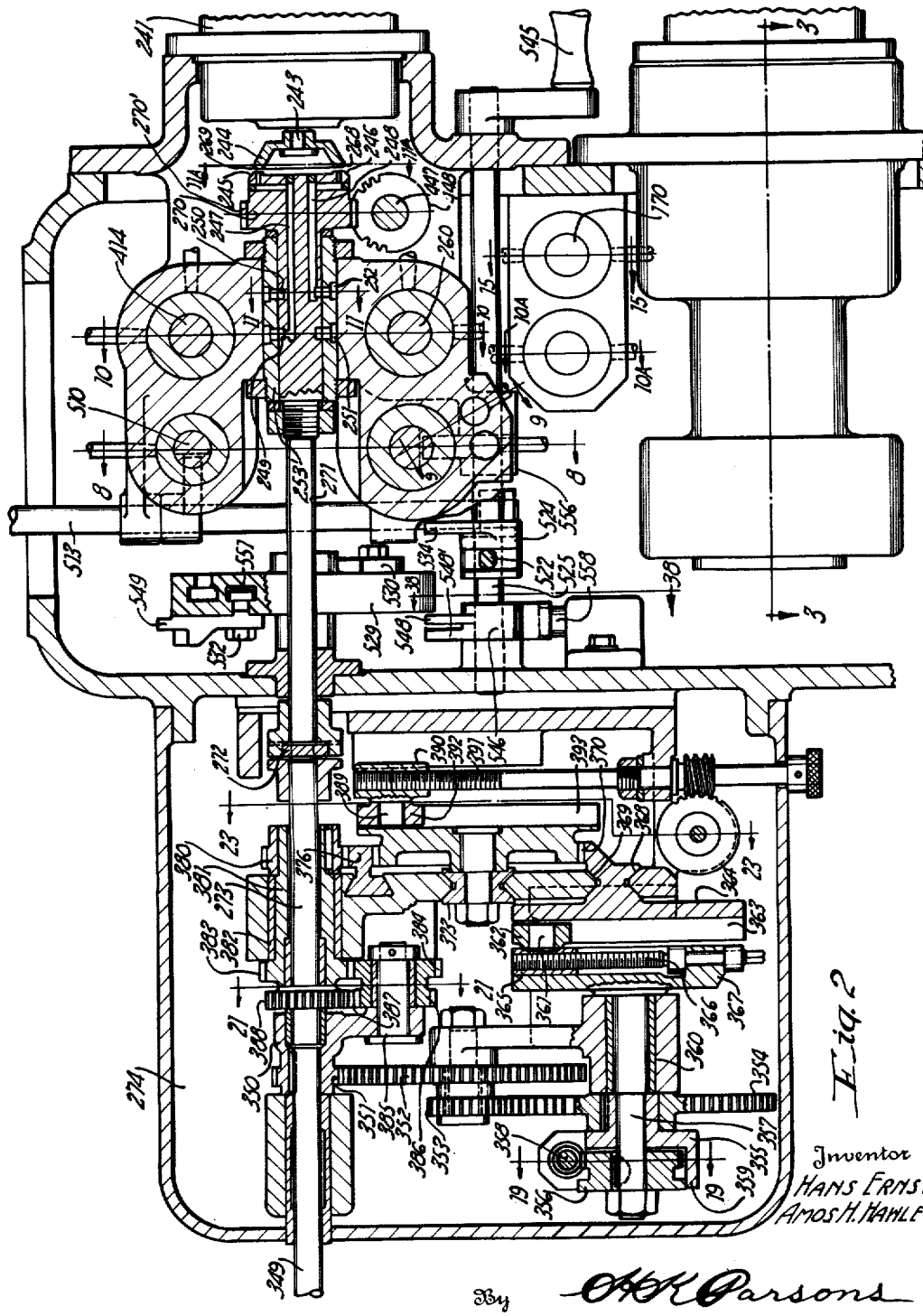
Figure 2 is an enlarged detail section as viewed on the line 2—2 of Figure 1.

Referring now to Figure 32, this mechanism includes the synchronous electrical transmitter including the stator coils 26 and the rotor 24, which are relatively movable simultaneously with relative movement between the rotor 25 and the stator coils 27 previously described. The stator coils 26 are electrically connected by lines 238, 239 and 240 to the stator coils 241 of a second receiver having a rotor 242. The rotor 242 is connected to shaft 243 which, as shown in Figure 2, has a dish-shaped disc 244 attached to the end thereof. This disc also has an annular face which moves relative to ports 245 and 246 to control the proportional values of the hydraulic resistances at these two ports. These ports are connected by interdrilling 247 and 248 to annular grooves 249 and 250, which are in constant communication with grooves 251 and 252 formed in sleeve 253'. Cross sections through the grooves 251 and 252 are shown more particularly in Figures 10 and 11, and it will be noted that these grooves communicate with pipes 253 and 254 respectively.

The pipes 253 and 254 run to opposite ends of a secondary valve 255, more particularly shown in Figure 10. This valve has a pressure port 256 which is connected to a branch line 257 of the previously described pressure line 158. The pressure from port 256 goes through hydraulic resistances 258 and 259, represented by reduced portions formed on the valve plunger 260 at opposite sides of spool 261, which is normally central with respect to port 256. Annular grooves 262 and 263 formed at the end of the hydraulic resistances convey the fluid to interdrilled channels 264 and 265 which lead to end chambers 266 and 267 respectively. By means of the connections previously described, the fluid will be conveyed by pipes 253 and 254 to the hydraulic resistance ports 245 and 246. This is another hydraulic amplification system whereby the movement of valve plunger 260 is controlled by the relative rotation of disc 244 with respect to ports 245 and 246. The disc 244 has a pair of shoulders 268 and 269 formed thereon, which are relatively movable with respect to ports 246 and 245 respectively to vary the resistance thereof in the same manner as explained in connection with disc 49, shown in Figure 6. It should thus be obvious that as the disc 244 rotates, the resistances at port 245 and 246 will be inversely varied, thereby causing a change in the relative pressures in chambers 266 and 267, and a shifting of valve plunger 260, which shifting will continue until each of the hydraulic resistances 258 and 259 have been readjusted to equal the values of their serially arranged resistances, or until the ratio of the resistances in one branch is equal to the corresponding ratio of resistances in the other branch, whereby movement of plunger 260 will stop.

The member 270, in which are formed the ports 245 and 246, is also rotatable relative to the sleeve 253'. This member is integrally connected to shaft 271, which, by means of an Oldham coupling 272 is, in turn, connected to an output shaft 273 of a parallax error correction unit, indicated generally by the reference numeral 274. This unit has an input shaft 275 which is operatively connected to shaft 209 shown in Figure 32.

By virtue of this connection it will now be seen that the member 270 will rotate substantially with the gun except for any small correction introduced by the parallax compensating unit 274, and that the disc 244 will move in unison with the transmitter rotor 24, and since these two movements are in the same direction no relative movement will take place between the member 244 and the ports 245 and 246 if the gun and director move together relative to the ship at their proper speeds. If, however, the gun gains or loses with respect to the director, a shifting of valve plunger 260 will occur. As shown in Figure 10, the valve 255, in which the plunger 260 is contained, has a second pressure port 276 which, as shown in Figure 32, is supplied from line 257. The valve also has a pair of ports 277 and 278 formed on opposite sides of the pressure port, and these ports are connected by channels 279 and 280, respectively, to a reversing valve, indicated generally by the reference numeral 281. This valve has a port 282 which is connected by channel 283 to one end of a cylinder 284 contained in the oscillatable member 231, more particularly shown in Figure 16.

The other end of this cylinder is connected by a channel 285 to ports 286 and 287 of the reversing valve, as shown in Figure 10.

The lines 283 and 285 have adjustable high resistances 288 and 289 respectively therein, whereby the flow to and from the ends of cylinder 284 will be relatively small, resulting in a very gradual shifting of piston 290.

The resistances 288 and 289, which are shown diagrammatically in Figure 32 as coils of fine bore tubing, may assume the form shown in Figure 31. This consists of a housing 291 containing a double throttle valve plunger 292. The housing has a pair of ports 293 and 294 to which the incoming lines may be connected, and a second pair of ports 295 and 296 to which the outgoing lines may be connected. The plunger has tapered portions 297 and 298 formed thereon which are simultaneously movable upon adjustment of the plunger by the screws 299 and 300 relative to ports 295 and 296 to throttle the flow therethrough. It will be noted that the tapered portions both extend in the same direction whereby the resistances of the ports are simultaneously increased or decreased.

Referring now to Figure 16, the piston 290 has a block 301 attached to the side thereof and this block carries a pin 302 which passes through a cross head 303 and has its end guided in a slot 304 formed in the member 231. The cross head 303 slides on the guide surfaces 305 and 306 formed on the end of lever 153.

The point 233, previously discussed in connection with the sinusoidal movements of link 153 and of member 231, is the center of pin 302. The mechanism just described serves to readjust the position of the pin 302 for the purpose of making corrections in the amplitude of gun movement for a given amplitude of motion of the transmitter 24 and therefore the mechanism may be defined as an amplitude corrector.

It is believed necessary to briefly review the operation of the mechanism as described so far, in order to appreciate why it becomes necessary to introduce amplitude correction, and to understand how this correction may be effected in a simple manner. The valve member 120, shown in Figure 17, is caused to take positions in accordance with the speed of the transmitter and therefore for every speed of the transmitter there is a correspondingly different position for the valve 120. This valve, in turn, causes movement of the valve member 155, which in turn controls the rate of operation of the hydraulic variable speed gear, to the output of which the gun is connected. In spite of the fact that the mechanism shown in Figure 17 may operate in a smooth manner, there is no basis for assuming that the output speed of the hydraulic variable speed unit corresponds correctly to the speed of the transmitter which determines the position of valve 120.

Since the movement of valve 155 never exceeds a very minute value as compared with the motion of valve 120 and its associated linkage, the point 154 may, for the purpose of illustration, be considered stationary. Thus, for a given cycle of angular movement of the transmitter there will be a definite cycle of angular movement imparted to the lever 153 about the point 154.

If the remaining portion of the linkage system were free to move about the several axes then a definite cycle of angular movement would be imparted to the swash plate 201. In practice, the swash plate does not move freely, thus resisting a displacement of the point 233 and causing a minute displacement of the point 154. As previously described, this causes rotation of the motor 156 which immediately produces a motion of the swash plate in the desired direction and limits further displacement of the point 154. Thus, by the provision of the servo-valve 155, the swash plate 201 is forced to execute the same cycle of angular movement as it would have if free.

A given cycle of angular movement of the swash plate produces a given cycle of angular movement of the output shaft 206, and thus a given cycle of angular movement of the gun relative to the ship.

In order that the amplitude of angular movement of the gun may correspond correctly to the amplitude of angular movement of the transmitter, it is obviously necessary that the lever system be correctly proportioned. It will also be apparent that by making the pin 302 adjustable, by means of the hydraulic circuit controlled through the valves 255 and 281, a continuous correction is provided for the lever arms. For example, if, in Figure 17, the pin 302 is moved downward by admission of oil through the line 283 (Figure 16), thereby shortening its lever arm with respect to the point 232, it will necessitate a greater angular movement of the swash plate 201 for the same movement of the valve 120. This results in a corresponding increase in the amplitude of movement of the output shaft 206.

In order to show clearly how this continuous correction for amplitude is provided, let it be assumed, for example, that the amplitude of angular movement of the shaft 206 is not of the correct magnitude to compensate properly for the amplitude of angular movement of the transmitter. If this be so, then the amplitude of angular movement of the disc 244 will be greater or less than the amplitude of angular movement of the member 270.

Figure 35:
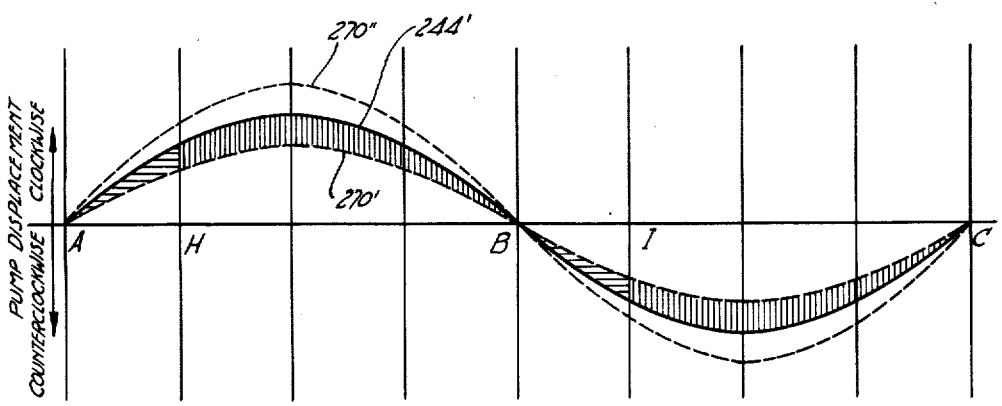
Figures 35, 36 and 37 are sinusoids which graphically depict the manner of applying corrections for phase and amplitude of gun movement as respects director movement.

If it is assumed for the time being that the phase relation of these movements is correct, and that the motion of the disc 244 is as represented by the curve 244', Figure 35, then the curve representing the motion of the member 270 will be either above or below the curve 244', as shown by the lines 270' and 270'', which respectively represent a greater or lesser amplitude than the required amount.

In the case where the amplitude of the member 270 is less than that of the disc, as represented by the curve 270', it will be apparent that when the disc is rotating in a clockwise direction (Figure 11a) as from the time A to the time B (Figure 35) the ports in the member 270 are displaced in a counterclockwise direction relative to the shoulders 268 and 269 on the disc. During this time, therefore, the resistance at port 246 will be greater than the resistance at port 245, and the pressure in line 254 will be greater than the pressure in line 253, thus causing the valve 260 to be displaced toward the left as viewed in Figure 10. This causes a small admission of oil through the port 278, line 280, reversible valve 281, line 283 and resistance 289 to the upper end of the cylinder 284, thus moving the pin 233 toward the center 232. From the time B to the time C, however, as when the disc is rotating in a counterclockwise direction, the ports in the member 270 are displaced in a clockwise direction relative to the shoulders, thus making the resistance at port 254 greater than that at port 246 and causing the valve 260 to be displaced toward the right. If the reversing valve 281 remains stationary, then fluid would be admitted from pressure line 276 to line 279 which is connected through line 287 and 285 to the lower end of cylinder 284, thereby causing the pin to move upward. But an upward movement of the pin, during one-half cycle, would cancel the corrective effect produced on the previous half cycle and in order to prevent this from occurring, the valve 281 should be provided with means to bring about its reversal as nearly as possible to the times A, B and C, and thus, in this case, maintain the flow to the upper end of cylinder 284. This corrective action will continue until the amplitude of the curve 270'' is equal to that of the curve 244'.

In the case where the amplitude of the member 270 is greater than that of the disc, as represented by the curve 270'', the ports in the member 270 are displaced clockwise relative to the shoulders 288 and 289, from time A to time B, and counterclockwise from time B to time C, thereby reversing all the above described conditions and bringing about a continuous admittance of fluid to the lower end of the cylinder 284. This corrective action will likewise continue until the amplitude of curve 270'' is equal to that of curve 244'.

The means for shifting the reversing valve 281 will now be described.

One such means of conveniently shifting this valve in approximate timed relation to the reversal of member 231, would be to connect opposite ends of this valve, which is shown in Figure 10A, by channels 344 and 345 to channels 165 and 166 which lead to the hydraulic motor 156. Since the curve 213 in Figures 28 and 29 represents the movement of the motor control valve member 155, and since when this valve crosses the abscissa 219 the flow changes in channels 165 and 166, and since this point of reversal may correspond to point 225 in Figure 28, which, in the case illustrated, is substantially 45 degrees out of phase with the next crossover point 346 of the swash plate 201, it will be apparent that the reversing valve 281 is shifted substantially 45 degrees ahead of the reversing of valve plunger 260 as at the times H and I in Figure 35. Although this will cause fluid to flow to cylinder 284 in the wrong direction for 45 degrees of its movement as from A to H, and B to I, nevertheless it will flow in the right direction through 135 degrees of movement as from H to B and I to C so that any small movement in a wrong direction will be nullified by a longer movement in the correct direction.

It should now be apparent that the function of the reversing valve 281, shown in Figure 10A, and 311, shown in Figure 18, is to correct the direction of flow of fluid to cylinders 284 and 314 as determined by valve 260, or in other words, to maintain a substantially continuous flow to the proper end of each of these cylinders, in spite of the fact that the valve member 260 is reversed each time displacement of member 270 relative to disc 244 changes from clockwise to counterclockwise or vice versa.

It, therefore, follows that the hydraulically actuated member 290, shown in Figure 16, is an amplitude corrector which is connected through a relatively high hydraulic resistance to operating pressure whereby movement thereof is automatically effected very gradually.

In addition, the position matching members 244 and 270 automatically correct for differences in phase between the gun movement and the director movement. To this end, the channels 279 and 280, shown in Figure 32, are connected by branch lines 307 and 308 respectively to ports 309 and 310 of a reversing valve indicated generally by the reference numeral 311 in Figures 18 and 32. This valve has a central port 312 which is connected by line 313 to the lower end of cylinder 314, which cylinder is contained in and is movable with the member 231.

The reversing valve also has a pair of ports 315 and 316 which are connected to a common line 317, leading to the upper end of cylinder 314. It will be noted that the channels 307 and 308 have hydraulic resistances 318 and 319, serially arranged therein, and these may take the form of an adjustable double throttle valve which may be the same as that previously shown and described in connection with Figure 31. Therefore, the opposite ends of cylinder 314 are connected through high hydraluic resistances to lines 279 and 280 whereby any movement of piston 320, which is contained in cylinder 314, will be very gradual.

The piston member 320 has a block 321 attached intermediate the length thereof, as shown in Figure 16, and this block carries a pin 322 which also has its free end guided in a slot 323 formed in the member 231.

The pin 322 passes through a cross head 324 which is movable on guide surfaces 325 and 326 of a slotted link 327 which is movable about a fixed pivot 328. The link 327 has a rounded end 329 by which it is connected to piston member 330. This end interfits in a cross slot 329' formed on one side of the piston member 330. Thus, as the member 231 oscillates about the axis 232 the cylinder 314 will be moved therewith, and if the pin 322 is eccentric to the axis 232 it will cause oscillation of the link 327 and thereby movement of the piston member 330.

Referring now to Figure 25, it will be noted that the opposite ends of cylinder 331 are connected by channels 332 and 333 respectively to channels 114 and 115.

From the previous description of Figure 25, it will be recalled that it was the transfer of fluid effected by pump 98' from one of channels 114, 115 into the other, that caused movement of the plunger 120. Due to this fact, the movement of plunger 120 was in a certain phased relation to the movement of the director. It will also be noted that it was the movement of plunger 120 that controlled actuation of the remaining parts of the mechanism and finally produced movement of the gun. By a comparison of curve 227 which represents the movement of the gun relative to the ship, and curve 134 which represents movement of the ship relative to the director, it will be seen that they are out of phase. It, therefore, becomes necessary to introduce a curve in accordance with the amount that the curve 227 is out of phase with the curve 134. The position matching mechanism serves also to measure the amount of this phase differential and through the circuit connections between the position matching mechanism and the cylinder 331, it gradually moves the piston 330 to effect the necessary correction. The theory upon which this is based is as follows.

Since oil is continuously flowing under pressure in channels 114 and 115, and incidentally continuously in the same direction, the branch lines 332 and 333, as well as the opposite ends of cylinder 331 will be continuously maintained full of oil. Furthermore, the pressure in these portions will be substantially equal at all times because the pressures in channels 114 and 115, although they momentarily change, due to action of pump 98', are instantaneously readjusted by movement of piston 120. Since it is the simple act of transferring fluid from one line to the other that causes movement of piston 120, it will be evident that it is possible to adjust the phase relation by superimposing a small sinusoidal transfer of fluid upon the transfer effected by pump 98', which is done in the present case by piston 330, and without in any way interfering with the action or effect of pump 98'.

In Figure 30, there is shown a curve 147 which represents the sinusoidal motion of valve 120, as effected by the pump 98'. This is identical with curve 147 on Figure 27. From the description of Figures 26 and 27, this curve may also be deemed to illustrate the rate of delivery of pump 98' and consequently the rate of transfer of fluid effected thereby. Also illustrated in Figure 30 is a curve 334 which illustrates the sinusoidal rate of transfer of fluid effected by piston 330 as it is oscillated by the member 231.

These two curves may be superimposed in the relationship shown for the following reason. The lever arm 326 which actuates the member 330, as shown in Figure 22, and the lever arm 153 which is connected to the valve 120, as shown in Figure 17, are both connected by pins 322 and 302 to the oscillatable member 231 which is connected to the swash plate, and therefore the lower ends of these levers must move in the same direction at the same time, which means that the upper ends of these levers must move in the same direction at the same time except for the small effect produced by the movement of the point 154, with the result that the connected members 330 and 120 respectively will have substantially the same cycle of movement. Thus, the movement of the member 330 is exactly in phase with the movement of the swash plate illustrated by the curve 229, Figure 29, while the movement of the member 120 is out of phase therewith only by the small lag corresponding to the difference 237 indicated in Figure 27.

Since the rate of transfer of fluid by the piston 330 will always be 90 degrees out of phase with the motion thereof in a leading direction, the total difference in phase between the curves 334 and 147 will be 90 degrees plus the quantity 237, and thus they may be plotted in the relationship shown in Figure 30.

By algebraically combining these two curves, a new curve 335 may be found which will represent the new movement that is now imparted to the valve member 120. Since the phase of the new curve of movement of member 120 is changed or shifted in a leading direction by the amount 237 it will be apparent that the phase of all of the curves which depend upon the curve representing the movement of the valve 120 will also be shifted, with the result that the phase of curve 227, which represents the relative movement of the gun with respect to the ship, as shown in Figure 27, will also be shifted, as to the left, and cause point 336 to lie on the ordinate 337. This indicates that the relative movement of the gun with respect to the ship is in phase with the relative movement of the ship with respect to the director, or in other words with the curve 134 shown in Figure 26, although opposite thereto, which, as previously explained, is desired.

The foregoing theory of compensation for phase lag is based on the assumption that the piston 330 has the correct amplitude of movement with respect to the movement of the swash plate, as determined by the position of the pin 322. Automatic phase matching or correcting mechanism has, however, been provided to continuously correct the position of this pin. This mechanism includes the position matching members 244 and 270, the valves 255 and 311, and the piston 320 contained in cylinder 314.

Figure 36:
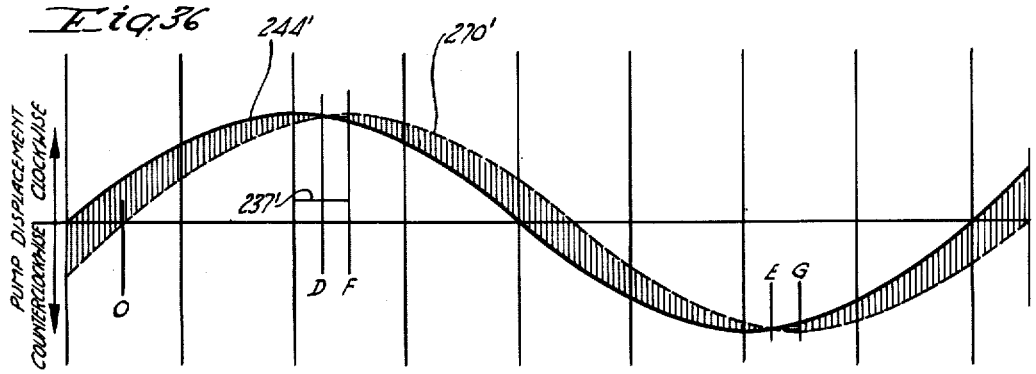

If it be assumed for the time being that the amplitude of motion of the member 270 corresponds exactly to the amplitude of motion of the disc 244, but that there exists a phase lag; then their motions may be represented by the curves 270' and 244' in Figure 36 in which the phase lag is represented by the quantity 237'. Thus, it is apparent that the lever arm of pin 322 with respect to center 232 must be too short, resulting in too small a motion of the piston 320, and too small an amplitude on the rate of transfer curve 244, Figure 30.

As previously described, the pressure delivered alternately to lines 279 and 280 is reversed when the displacement of the member 270 relative to the disc 244 changes from counterclockwise to clockwise and vice versa. As illustrated in Figure 36, this occurs at the times D and E respectively.

If the lines 279 and 280 were connected directly to the opposite ends of cylinder 314, the pin 322 would be alternately moved in opposite directions during each succeeding half cycle, thus accomplishing no permanent corrective effect. In order to maintain as nearly as possible a continuous corrective flow to the cylinder 314, the reversing valve 311 has been introduced. This valve has a plunger 338, connected by a link 339, to the swinging member 231, as shown in Figures 16 and 18, thus the reverse of flow effected thereby will take place at the times F and G, Figure 36.

At the instant of time represented by the ordinate O, in this figure, the member 270 is rotating in a clockwise direction but is displaced counterclockwise as viewed in Figure 11A with respect to the disc 244 which is also rotating in a clockwise direction. Therefore, the resistance at the port 246 will be greater than that at the port 245, causing the pressure in line 248 to be higher than that in line 247, and thus shift the valve plunger 260 toward the left as viewed in Figure 10. This will connect pressure port 276 to channel 280, resistance 318, line 307, and port 309 of reversing valve 311. The mechanical connections between the swash plate 201 and the member 270 can be made such that when the latter is rotating in a clockwise direction as at the time O, the upper end of the member 231 will be displaced to the right as shown in Figure 18, causing the connected valve plunger 338 to interconnect ports 309 and 312. Fluid will then be delivered to the lower end of cylinder 314, thus moving the piston and connected pin 322 upward.

This condition will continue to prevail until the time D. At this time the director has reversed, which it did at time D, and has taken up the counterclockwise displacement which is evidenced by the fact that the curves cross on time ordinate D.

Upon continued movement of the parts, a clockwise displacement begins to grow, and when this starts, as it does at time D, then the resistance at port 245 grows greater than at port 246 with a resultant shifting in the opposite direction of valve 255 and admittance of pressure this time to line 279 which is connected through resistance 319, line 308 to port 310 of reversing valve 311. From here it passes through port 316 and line 317 to the upper end of cylinder 314, thus moving the piston 320 and pin 322 downward. This incorrect direction of piston movement will continue to the time F when the swash plate crosses center, thus reversing the port connections in valve 311 and again supplying fluid to the lower end of cylinder 314. This correct direction of piston movement continues until the time E. At this time the disc 244 has already reversed and the previous clockwise displacement of the member 270 relative thereto now changes to counterclockwise, thus causing valve plunger 260 to shift and again cause flow to the upper end of cylinder 314. This will continue to the time G when the valve 311 again reverses the flow and causes the piston 320 to be moved upward, which is the same condition as at the time O. The cycle then repeats indefinitely.

As the sum of the times D—F and E—G is equal to the phase lag, and this is necessarily only a small percentage of the entire cycle time, it is obvious that the direction of fluid flow and piston movement will be correct over a very large part of the cycle. This corrective action will continue until the phase lag becomes zero.

Figure 37:
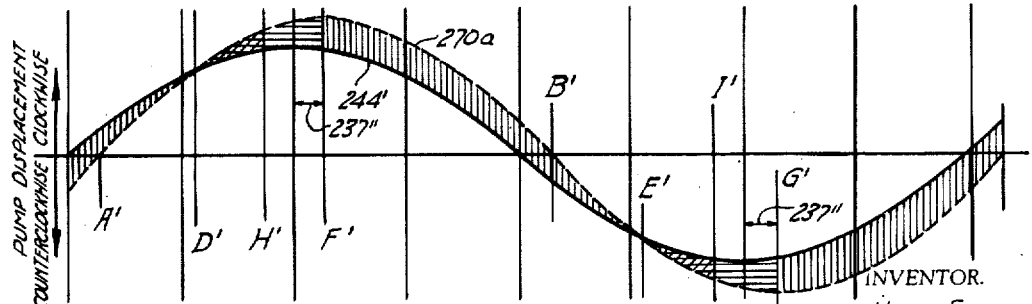

It may so happen that a phase and amplitude difference may exist simultaneously and such a condition is graphically represented in Figure 37 in which the curve 244' represents the movement of disc 244 and the curve 270A represents the motion of the member 270. Wherever these two curves cross, as at D' and E', the valve member 260 is reversed. It will be noted that between these two points the amplitude of curve 270A is greater than curve 244, with the result that fluid should be admitted to the lower end of cylinder 284 to correct for this. Also, this indicates that the ports in the member 270 are displaced clockwise relative to the shoulders 288 and 289, thus making the resistance at port 254 greater than that at port 246 and causing the valve 260 to be displaced toward the right. Fluid will, therefore, be admitted from pressure line 276 to line 279 which is connected through lines 287 and 285 to the lower end of cylinder 284. The reversing valve 281 is not in the correct position to connect line 279 to the lower end of cylinder 284, but will be shifted to the correct position at the point H' which is located approximately 45 degrees ahead of the time F', which represents the reversal of member 270. It will, therefore, be seen that the flow to the amplitude corrector is incorrect from the time D' to the time H', but is correct from the time H' to the time E'. Since the time from H' to E' is much greater than the time D' to H' it will be apparent that the proper correcting effect will go on for a much longer time than the incorrect effect.

The phase lag is represented by the quantity 237". As was previously mentioned, at the time D', the valve 260 was shifted into such a position that the pressure port thereof was connected to line 279 which is connected through resistance 319 and line 308 to port 318 of reversing valve 311.

The reversing valve 311 is in the wrong position, however, to connect line 279 to the lower end of cylinder 314 but at the time F' it will be shifted to the correct position because this is the time when the swash plate passes through its center position and moves valve 311 across center. This means that the flow is correct from the time F' to E' and incorrect from the time D' to F' and therefore the time of flow to the correct end of the phase correcting cylinder is much greater than the time of flow to the incorrect end of the cylinder so that a resultant corrective effect is obtained.

It will thus be obvious that the position matching mechanism is capable of effecting a correction for a difference in phase or a difference in amplitude severally, or for effecting a correction for both simultaneously.

After the mechanism has been installed and operated for a while, very little, if any, correction for phase or amplitude should be necessary, which means that the position matching members will run together, and the valve member 260 will be substantially in a central position, with the result that the port 276 will be substantially closed, and no fluid will be delivered into lines 279 and 280.

When the ship is in still water, and therefore has no oscillatory movement, the valve member 260 will be in a central position, as well as the valve member 155 which controls the flow to the hydraulic motor 156. If under this set of conditions, the director is manually moved at a very slow rate, the response of valve member 155, which only has a very small movement anyway, may not be sufficient to cause the motor 156 to immediately follow up this slow rate of movement. If the motor 156 does not cause an immediate follow-up it will be apparent that there will be a displacement between the disc 244 and the member 270 of the position matching mechanism which will produce a pressure differential in lines 253 and 254 and a shifting of the valve 255. This will cause a pressure flow in one of channels 279—280. The pressure flow which is created in either one of these channels is utilized to supply fluid to motor channels 165 and 166 and thereby assist in causing immediate operation of motor 156. This is accomplished by connecting channels 279 and 280 through resistances 347 and 348 respectively to channels 166 and 165. These resistances, although shown as coils in Figure 32, may be of the adjustable form like that shown in Figure 31.

Since the disc 244 moves immediately with the director, it will be apparent that if the gun does not immediately follow up this movement of the director a displacement will take place between the position matching members which will cause a small flow of oil into the correct motor channel to assist the rotation thereof in the correct direction to effect the necessary follow-up movement.

A gun has two major adjustments, one of which is effected in train and the other in elevation. When the gun is adjusted in train and controlled from a remote fire control station it is necessary to make a correction for parallax when the station is located in any other position than on the axis of the gun turret. The mechanism of this invention may be utilized for controlling either one of these major adjustments as previously mentioned, but when the mechanism is utilized to control adjustment in train, a parallax compensating mechanism, such as that shown in Figure 2, is combined therewith. It will be noted that this mechanism is interposed in the feed back train from the gun to the position matching mechanism.

The parallax compensating device has a shaft 349 which is connected in an 18 to 1 ratio with the gun, which means that for one revolution of the gun in train this shaft will make 18 revolutions. A bracket 350 is keyed for rotation with this shaft and has gear teeth 351 formed thereon which intermesh with a large gear 352. Integral with the gear 352 is a pinion 353 which intermeshes with a gear 354 keyed to the hub of a phase adjuster 355. This adjuster consists of a worm gear 356, which is keyed to shaft 357, and a worm 358, which is carried in a bracket portion 359, as more particularly shown in Figure 19.

The gear train just described causes the shaft 357 to rotate in a 1 to 1 ratio with the gun. This shaft is journaled in a bearing 360 and beyond the bearing is an adjustable crank pin 361. The crank pin carries a block or cross head 362 which is guided in a cross slot 363 formed in a translatable member 364. The pin 361 is fastened to a threaded block 365 which is adjustable by a threaded screw 366 held against longitudinal movement in the portion 367 integrally formed on the end of shaft 357. This screw is utilized for effecting base line adjustment, that is, to make correction for the horizontal distance existing between the director and gun.

Since provision is usually made for selectively controlling the gun from one of a plurality of fire control stations, suitable graduations may be applied to indicate the setting for each station which might be utilized to control the gun, rather than graduations in units of linear measure.

It will be apparent that when the director is sighted along a base line, such as the center line of the ship, and the gun is also pointing along the center line of the ship, no parallax correction is necessary, and that as the director and gun swing through an angle to the right or left of this line the parallax correction gradually increases up to a maximum, at which time the director has moved through an angle of substantially 90 degrees, or in other words, is approximately perpendicular to the center line of the ship. Since the function of the crank pin is to introduce a gradual increasing correction, it will be apparent that it must be in positional agreement with the gun.

The object of the phase adjusting worm 358 is to provide for adjustment of the member 367 to place it into positional agreement with the gun without disturbing the rest of the mechanism.

The member 364 travels on V-shaped guides 368 and 369 as more particularly shown in Figures 2 and 23. This member also has integrally formed therewith a rack 370 which intermeshes with teeth on gear 371, which is rotatably supported on a pin 372 carried by a reciprocable support 373 which also slides on V-shaped guides 374 and 375. A double rack bar 376 is slidably mounted in a dovetail guideway 377 for movement parallel to the rack bar 370, but on the opposite side of gear 371. The rack bar 376 has rack teeth 378 formed on one side which intermesh with gear 371; and rack teeth 379 on the opposite side which intermesh with a gear 380 keyed to a sleeve 381 externally journaled in a bearing 382. The sleeve 381 has a gear 383 formed integral therewith, which intermeshes with a gear 384 mounted on a pin 385, carried in the end of the bracket 350. The gears 383 and 384 have a 1 to 1 ratio. Integral with the gear 384 is a gear 386 which is connected through an idler 387, as more particularly shown in Figure 21, to gear 388 keyed to the end of shaft 27B. The gears 386 and 388 are in a 1 to 1 ratio.

It will be noted that the bracket 350 is integral with the gear 351 and will therefore rotate therewith and carry gears 384 and 386 in a planetary motion about gears 383 and 388 respectively. If the gear 383 is held again rotation as the planetary gears move around the sun gears the gear 388 will be given two revolutions for one revolution of shaft 349 whereby the output shaft 273 will be in the ratio of 36 to 1 to the gun.

If now, the gear 383 is rotated in either one direction or the other, during rotation of the member 350, it will increase or decrease the 2 to 1 ratio existing between the shaft 271 and the shaft 349 and thereby introduce a correction which will cause the gun to gain or lose with respect to the director, and thus make it possible to correct for parallax in accordance with the movement of the gun.

The parallax angle is a function, not only of the horizontal distance between the director and the gun but also of the range. It should be obvious that the greater the range, the less the parallax angle. The range adjustment is introduced by providing a pin 389 carried by a block 390 which is threaded on the adjusting screw 391. The pin has a roller 392 which interfits in a cross slot 393 formed in the face of the gear 371. The cross slot has a length greater than the diameter of the gear whereby the center of the pin may be adjusted into juxtaposition with the line of contact between the gear and the rack 378.

When the pin is so adjusted, movement of the rack 378 will not cause any rotation of gear 380 whereby the shaft 273 will rotate in a 36 to 1 ratio with the gun. This means that no correction is introduced and that the gun moves through the same angles as the director. The range is therefore infinite for this setting, while for reduced ranges, the pin 389 is moved downward, as viewed in Figure 2.

The gear 371 with the adjustable pin 389 really constitutes an adjustable lever connection between the member 378 and the rotatable gear 380, and it will be noted that the position of the pin 389 and the amount of movement of the member 378 determine the angle through which the lever is moved, which angle will be formed by the intersection of the axis of the cross slot 393 with a perpendicular. This angle thus becomes a function of the range, and of the distance between the director and gun. Thus, there will be introduced at all times a proper compensation in accordance with the range, and the distance of the fire control station from the gun.

The situation often arises under actual operating conditions that a particular turret may have to be selectively controlled by different fire control stations, so that if one station is swept away in the stress of battle another may assume control. This change may be effected by a suitable switch which will disconnect the lines 30, 31 and 32 from the transmitter 27 and connect them through other lines to a new fire control station. Since in the case described, one revolution of the shaft 23 and its rotor 25 only effects 10 degrees of gun movement, because this particular device is connected in a 36 to 1 ratio with the director, it is apparent that any given position of the shaft will correspond to a plurality of director positions which will be spaced by 10 degree intervals. Thus, it might so happen that the corresponding control shaft and rotor at the new station may have a phase difference of 10 degrees or a multiple thereof, with the result that no change would follow in the position of the gun and the one would still be 10 degrees out with respect to the other. It is, therefore, necessary to provide additional means whereby this contingency cannot occur. Thus, there is provided a master control circuit which connects the director and gun in a one to one relation, and which will thereby detect positional differences between the two, so that even although the new control station is 10 degrees or a multiple thereof out of phase with the receiver the master system will still detect this situation and make the necessary correction.

Since the shaft 23 rotates 36 revolutions to one revolution of the director, it is necessary to gear this shaft down by a worm and worm gear 394 to the rotor 395 of a third electrical transmitter, indicated generally by the reference numeral 396. This transmitter is connected by lines 397, 398 and 399 to a receiver, indicated generally by the reference numeral 400, having a rotor 401 connected to shaft 402. This shaft operates an hydraulic amplification device, similar to that shown in Figure 2, and operated by shaft 243. This unit, which is indicated generally by the reference numeral 403 in Figure 32, is connected by channels 404 and 405 for actuation of a master control valve 406. These channels are connected to a manually operated reversing valve 407 from which emerge lines 408 and 409, which are actually connected to opposite ends of the control valve 406. The master control valve 406 has three pressure ports 410, 411 and 412, which are connected by a plurality of branch lines to a supply line 413 leading from the pump 56. Opposite the port 411, the valve plunger 414 has hydraulic resistance portions 415 and 416 formed on opposite sides of a central spool 417.

These resistances cause a drop in pressure in the fluid as it passes from port 411 to the annular grooves 418 and 419 respectively. From these grooves the fluid flows through internal bores 420 and 421 respectively to opposite ends of the valve. The fluid then flows through channels 408 and 409 to the unit 403 from which it escapes through hydraulic resistances controlled by the rotatable disc 422, in the same manner that the disc 244, shown in Figure 2, controlled the hydraulic resistances at ports 245 and 246. The shoulders on disc 422, however, are so positioned that they normally close or produce a high resistance at each port and may be rotated a few degrees, preferably not more than four degrees, in either direction from a central position without causing any movement of the valve plunger 414. This permits the disc 244 to assume control for small movements without interference from the master control.

Referring to Figure 10, it will be seen that dependence is not placed entirely on the hydraulic amplification means to hold the valve plunger 414 in a central position, but that plungers 423 and 424 are slidably mounted in the ends of the valve and held in engagement with opposite ends of plunger 414 by means of springs 425. The plungers 423 and 424 have a shoulder 426 located thereon for limiting inward movement of the plungers and by properly positioning these shoulders, the plunger 414 may be located and held in a central position without the assistance of fluid pressure. This will prevent inadvertent movement of plunger 414 because even although the pressures on opposite ends of the plunger may be equal, it must be remembered that this entire structure is to be supported on a rolling ship, which means that the weight of the plunger might set up an oscillation that would interfere with the proper control of the mechanism if some additional steadying means were not provided.

The springs 425 should, therefore, be made at least strong enough to overcome any oscillation that might be set up by the inertia of plunger 414. They should not, however, be strong enough to interfere with the hydraulic amplification control. Sufficient clearance should be provided as at 427 and 428 between the end of plungers 423 and 424, and the closure caps 429 and 430, to permit movement of the plungers 423 or 424 in an outward direction to permit the valve plunger 414 to move away from its central position.

The manner in which this master system assumes control will now be explained. It will be recalled that the channels 158 and 160 which are connected to the servo-control valve of the motor 156, and shown in Figure 17, were pressure and exhaust channels respectively. These channels are not directly connected to the pump and to reservoir, but terminate in ports 431 and 432 of valve 406, as shown in Figure 10. As long as the plunger 414 is in a central position, the channel 158 is connected by cannelure 433 to the pressure port 412; and the channel 160 is connected by the cannelure 434 to the exhaust port 435. Should the valve plunger 414 shift, however, in either direction from its central position, these two connections will be broken and the lines 158 and 159 will become independently sealed. This will prevent the valve 155 from determining operation of motor 156. However, it is still necessary to operate motor 156 in order to reposition the gun in phase with the new director, and means are provided whereby this control may be assumed by the master control valve.

Referring to Figure 32, the motor control channels 165 and 166 have branches 436 and 437, which terminate in ports 438 and 439 of valve 406. It will be noted from Figure 10 that these ports are located on opposite sides of the pressure port 410, whereby when plunger 414 is shifted from its central position, the pressure port 410 will be connected by either cannelure 440 or cannelure 441 to one of ports 438, 439, while the remaining port will be connected by the remaining cannelure to one of the exhaust ports 442 or 443. All of the exhaust ports 442, 443 and 435 are connected to a common return channel 444, which leads to the reservoir 445 from which the pump 56 is supplied.

The function of the master control valve is, therefore, to disconnect the valve 155 from control of the hydraulic motor 156, and to assume control of operation of said motor until the gun has again been brought into substantial phased relation with the director. The feed back from the gun, beginning at the gear 270' on member 270, shown in Figure 2, actuates, through gear 448, shaft 447, and a second spiral gear keyed to the shaft, the spiral gear 446 and attached member 403. Due to the few degrees of overlap between the member 422 and 403, the master control valve plunger 414 will be moved to a central position before actual in-phase relationship is established between gun and director. This shifting will re-establish control by valve 155, which will then control actuation of motor 156 until the exact relationship is established.

The mechanism described so far is that portion which is utilized for automatic control of gun positioning in train from a remotely located station. For complete and satisfactory control, both in train or in elevation, it is desirable, however, to provide means for positioning the gun from a point adjacent thereto, in case such remote control stations are swept away or otherwise rendered inoperative. Two alternatives are provided for, one in which the screw 194 of the hydraulic variable speed unit may be operated on the servo-principle and controlled by hand, which thereby reduces the labor of the operator; and the other in which the screw is directly rotated by hand.

A selector valve 169, previously referred to and shown in Figures 15 and 32, has been provided for choosing between these various manners of operation. This selector valve is operated by a handle 449 which, as shown in Figure 1, is pivotally mounted on a bracket 450 projecting upwardly from the housing 196. This handle is keyed to a shaft 451 shown in Figure 13, and the handle has an integral crank portion 452 which is connected by a link 453 to the plunger 107 of the selector valve. The shaft 451 also has keyed thereto a shifter 454 for the clutch member 455 which is slidably keyed on shaft 456. This member carries clutch teeth 462 and gear teeth 487. It will be noted that this shaft terminates in a reduced portion 457 which is antifrictionally journaled in the end of gear 458. This gear, however, is keyed to a shaft 459 which has an integral bevelled gear 460 intermeshing with a pinion gear 461 formed integral with the member 185.

The clutch teeth 462 formed on the end of the member 455 are adapted to interengage with teeth 463 formed on the end of gear 458 when it is desired to rotate the shaft 459 directly from shaft 456.

When the handle 449 is rotated counterclockwise from the position shown, the crank 452 and shifter 454 also move counterclockwise, thereby positioning the selector valve plunger 170 in the automatic position, which position it was assumed to be in during the previous description of automatic control. This position of the parts in indicated by the dash and dot line 464.

When the handle 449 is moved to the position shown in Figure 1, which corresponds to the position indicated by the dash and dot line 465, in Figure 13, the various parts will be in the position as they are shown in that figure. This results in the motor control lines 165 and 166 becoming disconnected from ports 171 and 172. The automatically controlled servo-valve 155 thus no longer controls operation of motor 156. The motor channels 173 and 175, however, have branch connections 466 and 467 to ports 468 and 469 of a manually-operable servo-control valve 470. The servo-valve 470 has a pair of exhaust ports 471 and 472 connected to a common line 473 which, as shown in Figure 15, terminates in port 474. It will be noted that this port is now connected by a cannelure 475 to a return line 476 which goes to reservoir. The selector valve has a pressure port 477 which is connected by channel 478 to the annular groove 479 of the master control valve, as shown in Figure 10, and since this groove is supplied directly by pressure channel 413 from pump 56, the port 477 is continuously supplied with pressure regardless of the position of the master control valve.

The valve plunger 170 connects pressure port 477 to port 480, which has a channel 481 leading to port 482 of the servo-valve 470. It will now be evident that when the selector valve is moved to its central position, as shown in Figure 15, it connects fluid pressure to port 482 of the manually-operable servo-valve 470; connects ports 472 and 471 to reservoir; and disconnects the automatic servo-control valve 155 from the motor lines 173 and 175. This enables the servo-valve 470 to now control operation of the motor 156.

This servo-valve 470 is of the rotary type and consists of a central rotatable plunger 483 to which is keyed a gear 484 intermeshing with gear 458; and a sleeve 485 to which is keyed a gear 486 which is adapted to be intermeshed with gear 487 when the latter is in its central position. As shown in Figure 32, the shaft 456 has a bevel gear 488 attached to the upper end thereof which intermeshes with a bevel gear 489 secured to shaft 490. This shaft is journaled in the upper end of the bracket 450, and as shown in Figure 1, has a pair of operating cranks 491 and 492 attached to either end thereof. By means of the hand cranks 491 and 492 the operator may rotate shaft 456 and thereby, through the gears 487 and 486, rotate the sleeve 485.

As shown in Figure 34, each of the ports in sleeve 485 really consists of an annular groove and four radial holes drilled in the bottom of each groove and spaced 90 degrees apart, which spacing is shown in Figure 14. The member 483 has two pairs of longitudinally aligned grooves 493, 494, and 495, 496. The grooves 493 and 495 serve to interconnect, upon counterclockwise rotation of sleeve 485, pressure port 482 with the motor port 469; and the grooves 494 and 496 serve to interconnect at the same time the motor port 468 with the exhaust port 471. This will cause one direction of rotation of the hydraulic motor 156. The member 483 also has a second pair of longitudinally aligned slots 497, 498 and 499, 500. Upon clockwise rotation of the sleeve 485, the motor port 469 is interconnected to the exhaust port 472; and the pressure port 482 is interconnected to the motor port 468. It will thus be seen that opposite rotation of the hand cranks 491 and 492 will effect opposite rotation of the hydraulic motor 156, and when this occurs there is a feed back from member 185, Figure 13, through gears 461—460, shaft 459, gear 458 and gear 484 to the central member 483 of the servovalve, which will cause this member to follow up the movement of the sleeve 485, and automatically terminate operation of the motor 156. This constitutes the manner of operation for the manual servo-control operation.

When the handle 449 is rotated clockwise to the third or hand position, indicated by the dash and dot line 501 in Figure 13, the clutch teeth 462 will be interengaged with the clutch teeth 463, and the gear teeth 487 will be withdrawn from mesh with the gear 486, whereby the screw 194 will be directly rotated by hand whenever the hand cranks 491 and 492 are actuated by the operator.

In order to prevent excessive angular separation between the grooves in member 483 and the radial ports in member 485 upon disengagement of the gears 487 and 486, when the gear 458 is rotated, the pin 561 and slot 562, Figure 34, have been provided to form a limited lost motion driving connection. Upon movement to this position, the spools 502 and 503 disconnect lines 473 and 481 from the exhaust and pressure lines 476 and 478 respectively; and the cannelures 504 and 505 formed in the plunger interconnect ports 171 and 172, to which the motor lines are attached, to ports 506 and 507. These two ports are connected together by a branch line 508. This causes the two motor lines 173 and 175 to be short-circuited whereby if there is fluid in the motor supply lines or in the motor, the same will not interfere with manual rotation of the screw 194.

In order that these lines may be maintained filled with oil and prevent leakage of air into the lines, a high resistance leak 509, which may be in the form of a coil of small bore copper tubing is utilized to interconnect the line 508 to the pressure groove of port 477 of the selector valve 169.

Auxiliary apparatus, including the reversing valve 407 and the stop valve 177, both of which have been previously mentioned, have been provided in conjunction with the training mechanism together with suitable controls, whereby the gun, when under the control of the director system, may be stopped at will, or automatically stopped when it has reached either limit of its movement; or entirely disconnected from the director system and its movement governed locally.

The manner in which these valves are connected in the training mechanism and the auxiliary controls therefor will now be explained. The reversing valve 407 has a plunger 510 which is movable from the central position, in which it is shown in Figure 8, to either side thereof for connecting the pressure line 55 to either the line 408 or 409 to cause shifting of the master control valve plunger 414. It will also establish an exhaust connection from the other line to one of the reservoir lines 511, 512. This plunger is operated by a shaft 513 which is rotated by a handle 514 attached to the upper end thereof; and a crank 515 which engages a slot cut in the side of the plunger 510 as more particularly shown in Figures 2 and 12 of the drawings.

By rotating the handle 514 to either side of a central position, the valve plunger 510 may be shifted to disconnect control of the gun from the director system and effect movement of the gun at will in either direction. This should be evident from the fact that a rise in pressure in one of lines 408, 409 and a drop in pressure in the other will cause shifting of the plunger 414 and interconnect the pressure port 479 to one of the motor lines 438, 439 whereby the motor 156 will be rotated in a direction predetermined at will by the operator. When the handle 514 is returned to a central position, the lines 408 and 409 are reconnected to channels 404 and 405, whereby the director system may again assume control, and automatically position the gun in synchronized relation with the transmitter.

To aid in positioning the reversing valve in a central position, the shaft 513 has attached to its lower end an arm 516, in the end of which is formed a notch 517 so positioned as to be engaged by a detent 518 when the reversing valve 510 is in a central position. This detent is carried by a bell crank 519 which is pivotally mounted for movement about a pin 520, and a spring 521 is so connected to the bell crank as to urge the same in a counterclockwise direction, as viewed in Figure 12, so as to hold the detent in engagement with the notch.

When the shaft 513 is rotated, either clockwise or counterclockwise from a central position, the detent 518 is forced out of the notch 517, and after a small angular movement of the shaft, the detent will engage the curved sides 526 and 527 and with the aid of spring 521 will complete rotation of shaft 513 and thereby movement of valve plunger 510 to either one of its running positions. Furthermore, it will hold the plunger in said position until the parts are returned to a central or stop position by manual actuation of the handle 514.

The stop valve 177 is provided with controls whereby it may be utilized to stop movement of the gun at will from a local position, that is, adjacent to the gun; or it may be utilized in connection with automatic stops to limit the range of movement of the gun, it being remembered that the usual angular range of a gun in train is about 240 degrees and in elevation not more than approximately 60 degrees.

For manual actuation of the stop valve, the plunger 178 has a groove 555 formed near the end thereof into which fits the end of a shifter lever 556 keyed to the shaft 525. This shaft, as shown in Figure 2, extends to the exterior of the unit where it is provided with an operating handle 545 which serves as means to shift the stop valve plunger to either side of the midposition in which it is shown in Figure 9 to immediately stop the actuation of the hydraulic motor 156 and thereby stop movement of the gun, and without interfering with the setting of the remaining mechanism. When this valve is returned to a running position and if the director system has still been operating, whereby the members 244 and 270 of the position matching mechanism are way out of phase, then the master control system will come into operation to move the gun in sufficient phase relation to the director system that the members 244 and 270 of the secondary position matching system may assume control.

The construction and operation of the stop valve will now be explained. It was mentioned previously that the line running to port 183 of the hydraulic motor 156 ran through the stop valve 177, and this consisted of a line 175 which was connected to port 176 of the stop valve and a line 182 which ran from the stop valve to the port 183 of the hydraulic motor. When the valve is in a central position the port 176, as shown in Figure 9, is interconnected by port 180 to the cannelure 179, and as shown in Figure 8, this cannelure interconnects port 180 to port 181 and thereby to channel 182. Therefore, the flow to and from the motor is not interfered with when the stop valve is in a central position. It will now be apparent that if the stop valve plunger 178 is shifted to the right of this position it will close port 180, or if shifted to the left it will close port 181 and thereby in either case disconnect channel 175 from channel 182.

Means have also been provided whereby the stop valve will be automatically tripped when the gun has reached either limit of its movement, and to this end the shaft 528 has keyed to it a dog wheel 529. This shaft is operatively connected to member 403 which, as explained in connection with Figure 2, is actuated by the feed back from the gun.

The dog wheel 529 has a T-shaped groove 551 formed therein, as shown in Figure 7, by means of which T bolts 532 may be utilized to attach dogs 549 and 550 to the dog wheel. The ends of these dogs lie in different planes whereby the dog 549 is adapted to engage the trip finger 548 and the dog 550 will engage the finger 548'. These fingers are integral with a boss 546 which is keyed to the trip shaft 525.

In order to thoroughly understand the operation it must be explained that when the fluid is flowing from channel 182 in Figure 8 to channel 175, the motor 156 is operating in such a direction that the feed back shaft 528 and dog wheel 529 are rotating in a counterclockwise direction, as viewed in Figure 8, and that when the direction of flow is reversed, that is, pressure fluid is flowing from line 175 into line 182, the dog wheel 529 is rotating in a clockwise direction. Therefore, when the dog 550 comes around and engages the wing 548' to rotate shaft 525 in a counterclockwise direction it shifts the plunger 178 to the left and thereby closes port 181. At the same time, however, the port 539 is interconnected by the cannelure 538 to port 537, which port, as shown in Figure 8, is interconnected with a bore containing a spring pressed ball 535 which closes the end of an interdrilled passage 536 communicating with port 181.

The pressure from line 175 now acts to more firmly seat the ball 535.

The dog 550, having rotated the finger 548' in a counterclockwise direction, as viewed in Figure 8, and moved the valve plunger 178 to the left, is now in such a position as to prevent the plunger 178 from being moved back to its central or running position, which means that even if pressure should now be admitted into line 182 to cause a reverse movement of the gun and thereby a reversal in the direction of rotation of the dog wheel 529 in a counterclockwise direction it could not pass into line 175. Therefore, other means have been provided, consisting of the spring pressed check valve 535. When the flow to the motor 156 is reversed, the channel 175 is no longer a pressure channel, whereby the fluid pressure acting on ball 535 is removed, so that the new incoming pressure through line 182, and which cannot pass through port 181 because of the position of valve plunger 178, will force open the check valve 535 and continue through port 537, cannelure 538 and port 539 into channel 175. This will cause reverse rotation of the motor 156 and a counterclockwise rotation of the dog wheel 529, whereby the dog 550 will retreat from trip finger 548', making it possible to rotate shaft 525 in a clockwise direction to reposition the stop valve 178 in a central or running position.

A similar arrangement has been provided for stopping the gun at the other limit of its movement. In this case the dog wheel 529 will be rotating in a counterclockwise direction, and pressure will be flowing from channel 182 into channel 175. When the dog 549 engages the finger 548, the shaft 525 will be rotated in a clockwise direction and thereby shift the valve plunger 178 to the right of its central position. This will disconnect port 180 from port 181, but it will interconnect port 544, which is in constant communication with the interdrilled channel 536 to port 542 whereby the fluid will flow into the chamber containing the spring pressed check valve 541 which closes the end of an interdrilled passage 540 communicating with port 176.

The dog 549 now prevents return movement of the valve plunger 178 to a running position, but when the direction of flow of fluid is reversed the pressure from port 176 will open the check valve 541 and the fluid will flow through port 542, cannelure 543, port 544 to the interdrilled passage 536, and thereby into channel 182.

In order to hold the valve plunger 178 in its various positions to which it may be shifted, a detent mechanism has been provided in association with shaft 525 as more particularly shown in Figure 38. In other words, the boss 546 is provided with an indent 557 adapted to be engaged by a spring pressed detent 558 for holding the valve 178 in its central or operating position. As the shaft 525 is rotated in one direction or the other, the indent will pass over peaks 559 and 560 to complete the shifting movement of the valve to either one of its stop positions.

There is usually provided auxiliary apparatus by which the gun is loaded, and this apparatus occupies a fixed position with the result that the gun must be returned to a definite loading position after each shot is fired. In order that this may be done quickly and accurately, a definite stop has been provided whereby the gun will be automatically stopped in the loading position. This applies more particularly to the elevating mechanism. This means may comprise a dog 530 which may be attached as by a suitable T bolt to the dog wheel 529 and preferably to the side opposite the one to which the limit dogs are attached. This dog is adapted to cooperate with a finger 534 which is integral with a boss 524 splined on the shaft 525 and having a notch 523 formed in the side thereof which is interengaged by the end 522 of the bell crank 519.

When the operator desires to return the gun to a loading position he throws the handle 514 in the proper direction, but regardless of the direction in which he moves the handle the bell crank 519 will be moved by the spring 521 in a counterclockwise direction, as viewed in Figure 12, which will thereby shift the boss 524 relative to the shaft 525 and position the trip finger 534 in the path of the dog 530. The dog wheel 529 will be rotated by the feed back from the gun in a predetermined direction, but regardless of the direction, the stop valve will be shifted to a stop position, thereby automatically stopping the gun in the correct position for loading. After the gun is loaded, the operator only has to return the handle 514 and thereby the reversing valve 510 to a central position in order to cause return movement of the gun to its previous firing position because the master control system assumes control when the valve plunger 510 returns to a central position.

It will be noted that when the handle 514 is rotated to a central position it will automatically withdraw the trip finger 525 from the path of dog 530. This will permit the gun to be trained to another position requiring the dog 530 to pass by the finger 534 without interference therefrom.

When the above described control mechanism is utilized for effecting elevation of the gun there is no necessity for introducing a correction for parallax. There is a necessity, however, for introducing a correction for roller path error due to the fact that it seems to be practically impossible to build the roller path in a plane which is exactly at right angles to a vertical plane passed through the center line of the ship. In other words, if the plane of the roller path lies in other than a horizontal plane when the ship is in a normal vertical position, this inclination will affect the elevation setting of the gun and the error will vary upon the position of the gun in train.

There is, therefore, substituted for the parallax corrector a roller path error corrector which is similar to the parallax corrector, and is shown in Figure 33. One difference, however, is that the shaft 552 is connected to the elevating mechanism and the shaft 553 is connected to the training mechanism of the gun. The shaft 553 has a pinion 554 attached thereto which intermeshes with gear 354. The shaft 357 which supports the gear 354 is still driven in a 1 to 1 ratio with the gun so as to be in positional agreement therewith so as to introduce the necessary correction in accordance with the position of the gun in train. It will be evident that if the plane of the roller path is inclined to the horizontal in any direction there will be a diameter which may be passed through the plane containing the roller path, and about which it may be said that the plane is revolved from the horizontal.

When the gun is pointing in a direction parallel to this diameter, there is, of course, no correction for roller path error, but as the gun swings away from this diameter in either direction, a gradual correction must be introduced which thereby explains the necessity for connecting the shaft 553 to the training mechanism.

There has thus been provided an improved control mechanism which may be utilized with the modifications previously set forth, not only to automatically control the position of the gun from a remote control station either in train or in elevation but auxiliary controls whereby the gun may be manually controlled from a position adjacent thereto.

What is claimed is:

1. In a mechanism for maintaining a gun trained on a target regardless of constant movement of a supporting ship including a director, gyroscopic means for maintaining the director trained on a target, power operable means for actuating the gun, means controlled by relative movement between the director and supporting ship for controlling said power operable means and causing relative movement between the gun and ship, and position matching means having a portion directly responsive to movement between the gun and ship, a second portion directly responsive to movement between the director and ship, and means effective on said power operable means for varying the effect thereof when positional differences exist between said portions.

2. In a gun control mechanism, the combination with a servo-motor mechanism for controlling the rate and direction of a variable speed hydraulic unit coupled for movement of a gun including a servo-valve, of means for actuating said valve in accordance with the rate and direction of movement of a remotely located director including a motor-pump unit, a rate and direction controller for said motor, a self-synchronous transmitter and receiver, hydraulic amplification means responsive to movement of the receiver for controlling the position of said controller and thereby the rate and direction of rotation of said motor, and means positionable in accordance with the rate of volumetric delivery of said pump for shifting said servo-valve to control the rate and direction of movement of said gun.

3. In a gun control mechanism, the combination with a servo-valve operatively connected for controlling the movement of a gun, of means responsive to movement of the director for controlling said servo-valve including a self-synchronous transmitter and receiver, one of which is responsive to movement of the director, a member operatively connected for shifting said servo-valve, and hydraulic amplification means responsive to movement of the receiver for controlling the shifting of said member.

4. In a gun control mechanism, the combination with a final power unit for moving the gun and servo-motor control mechanism for determining the rate and direction of gun movement effected by said unit, of means for coupling the director for shifting said servo-valve without lag including a motor-pump unit having a common eccentric, hydraulic amplification means for coupling the director for control of reversible operation of said motor, and means shifted in accordance with the rate of volumetric output of said pump for actuating said servo-valve.

5. In a gun control mechanism, the combination with a servo-motor mechanism for controlling the rate and direction of a variable speed hydraulic unit coupled for movement of a gun including a servo-valve, of means for actuating said valve from a remotely located director including a reciprocable plunger operatively connected to the valve, a pair of channels having connections respectively to opposite ends of said plunger, means to normally maintain equal flows and thereby equal pressures in said channels, and means controlled in accordance with the rate of movement of the director for transferring fluid from one of said channels to the other to differentiate the pressures therein to cause movement of said member.

6. In a gun control mechanism, the combination with a servo-motor mechanism for controlling the rate and direction of a variable speed hydraulic unit coupled for movement of a gun, including a servo-valve, of means for actuating said valve from a remotely located director including a reciprocable plunger operatively connected to the valve, a pair of channels having connections respectively to opposite ends of said plunger, means to normally maintain equal flows and thereby equal pressures in said channels, means controlled in accordance with the rate of movement of the director for transferring fluid from one of said channels to the other to differentiate the pressures therein to cause movement of said plunger, a position-matching mechanism having direct connections to the gun and director, and means operated by said position-matching mechanism for effecting a further transfer of fluid from one of said channels to the other to apply a corrective effect.

7. In a gun control mechanism, the combination with a servo-motor mechanism for controlling the rate and direction of a variable speed hydraulic unit coupled for movement of a gun including a servo-valve, of means for actuating said valve in accordance with the rate and direction of movement of a remotely located director, a feed back connection from the variable speed hydraulic unit including a pivoted lever operatively connected to said unit, a floating lever operatively connected to said servo-valve, and an adjustable fulcrum for connecting said first-named lever to the floating lever whereby the amplitude of gun movement may be varied with respect to the movement of the director.

8. In a gun control mechanism, the combination with a servo-motor mechanism for controlling the rate and direction of a variable speed hydraulic unit coupled for movement of a gun including a servo-valve, of means for actuating said valve in accordance with the rate and direction of movement of a remotely located director, a feed back connection from the unit to said valve including a lever operatively connected to the unit, a floating lever operatively connected to the servo-valve, an adjustable fulcrum connecting said levers whereby the amplitude of gun movement may be varied with respect to the director, fluid operable means for shifting said fulcrum, and a position-matching mechanism having connections to the gun and director for controlling said fluid operable means.

9. In a gun control mechanism, the combination with a servo-motor mechanism for controlling the rate and direction of a variable speed hydraulic unit coupled for movement of a gun including a servo-valve, of means for actuating said valve including a remotely located director, a reciprocable plunger operatively connected to the valve for shifting the same, a pair of channels having connections respectively to opposite ends of said plunger, means to normally maintain equal flows and thereby equal pressures in said channels, means controlled by the director for transferring fluid from one of said channels to the other to differentiate the pressures therein and cause movement of said plunger, additional means for transferring fluid from one of said channels to the other to apply a correction factor including reciprocable plungers, means to vary the stroke of said plungers including a fluid operable member, and means to control the pressure differential on said member.

10. In a gun control mechanism, the combination with a servo-motor mechanism for controlling the rate and direction of a variable speed hydraulic unit coupled for movement of a gun including a servo-valve, of means for actuating said valve including a remotely located director, a reciprocable plunger operatively connected to the valve, fluid operable means for controlling actuation of said plunger including a pair of fluid channels having continuous flow therethrough, means to normally maintain the pressures in said channels equal, means controlled by the director for transferring fluid from one of said channels to the other to differentiate the pressures and cause movement of said valve, a pair of plungers for transferring an additional amount of fluid from one of said channels to the other to apply a corrective effect on the position of said valve, a feed back connection from the gun for effecting one oscillation of said pair of plungers for each oscillation of the gun, and adjustable means for varying the length of stroke of said plungers.

11. In a gun control mechanism, the combination with a servo-motor mechanism for controlling the rate and direction of a variable speed hydraulic unit coupled for movement of a gun including a servo-valve, of means for actuating said valve including a remotely located director, an actuator for said valve, fluid operable means for controlling said actuator including a pair of fluid channels having continuous flow therethrough, means to normally maintain the pressures in said channels equal, means controlled by the director for transferring fluid from one of said channels to the other to differentiate the pressures and cause movement of said actuator and valve, a pair of plungers for transferring additional fluid from one of said channels to the other to apply a corrective effect on the position of said valve, a feed back connection from the gun for effecting one oscillation of said pair of plungers for each oscillatory movement of the gun, adjustable means for varying the length of stroke of said plungers, said last-named means including a fluid adjustable fulcrum for varying the throw of said plungers, a position-matching system having direct connections to the director and gun, and valve means responsive to position differences for shifting said fulcrum.

12. In a gun control mechanism, the combination with a servo-motor mechanism for controlling the rate and direction of a variable speed hydraulic unit coupled for movement of a gun including a servo-valve, of means for actuating said valve including a lever pivotally connected to said valve, a remotely located director, means operatively connecting one end of said lever for control by the director, means to couple the other end of the lever to a feed back mechanism of the hydraulic unit, additional means operatively connected to one end of said lever for correcting phase differences between the director and gun, and additional means coupled to the other end of said lever for correcting for amplitude differences.

13. In a gun control mechanism, the combination with a servo-motor mechanism for controlling the rate and direction of a variable speed hydraulic unit coupled for movement of a gun including a servo-valve, of means for actuating said valve including a lever pivotally connected to said valve, a remotely located director, means operatively connecting one end of said lever for control by the director, means to couple the other end of the lever to a feed back mechanism from the hydraulic unit, additional means operatively connected to one end of said lever for correcting phase differences between the director and gun, additional means for applying a correction to the other end of said lever for differences in amplitude between director movement and gun movement, and a common mechanism for automatically controlling the application of both of said corrections.

14. In a gun control mechanism, the combination with a servo-motor mechanism for controlling the rate and direction of a variable speed hydraulic unit coupled for movement of a gun including a servo-valve, of means for actuating said valve including a lever pivotally connected to said valve, a remotely located director, means operatively connecting one end of said lever for control by the director, means to couple the other end of the lever to a feed back mechanism from the hydraulic unit, additional means operatively connected to one end of said lever for correcting phase differences between the director and gun, additional means for applying a correction to the other end of said lever for differences in amplitude between director movement and gun movement, a position-matching mechanism having means for measuring the differences in phase and in amplitude of the movement of the gun with respect to the director, and means for translating these differences into actuation of the respective correcting mechanism.

15. In a gun control mechanism, the combination with a servo-motor mechanism for controlling the rate and direction of a variable speed hydraulic unit coupled for movement of a gun including a servo-valve, of means for actuating said valve including a lever pivotally connected to said valve, a remotely located director, means operatively connecting one end of said lever for control by the director, means to couple the other end of the lever to a feed back mechanism of the hydraulic unit, additional means operatively connected to one end of said lever for correcting phase differences between the director and gun, additional means for applying a correction to the other end of said lever for differences in amplitude between director movement and gun movement, said correcting means including a pair of position-matching members connected respectively to the director and gun, a reversing valve, hydraulic amplification means responsive to differences in relative position of said members for shifting said valve, a pair of channels extending from said valve for fluid actuating said phase corrector, a second reversing valve connected to said pair of channels, and an additional pair of channels extending from said last-named reversing valve for fluid actuation of said amplitude corrector.

16. In a gun control mechanism, the combination with a variable speed hydraulic unit for moving the gun, of a servo-motor mechanism for controlling the rate and direction of movement of said unit including an hydraulic motor and a servo-valve, a director, a speed-matching mechanism coupling the director for control of said servo-valve, a master control system including position-matching members, one of which is operatively connected to the director and the other to a feed back from the gun, a master control valve, hydraulic amplification means operable upon substantial positional differences of said members for shifting said valve, and means operable by said valve for disconnecting the supply of fluid pressure to said servo-valve and assuming control of the direction of rotation of said hydraulic motor.

17. In a gun control mechanism, the combination with a variable speed hydraulic unit for moving the gun, of a mechanism for controlling the rate and direction of operation of said unit including a motor operatively connected to the swash plate of said unit for adjusting the same, a first servo-valve for controlling operation of said motor, means operatively connecting said servo-valve for automatic control from a remotely located director, manually operable means for shifting said swash plate including a second servo-valve for controlling said motor, a shiftable clutch for directly connecting said manually operable means for actuation of said swash plate, a selector valve for determining the servo-valve to be employed for control of said motor, said means also including a shifter for said clutch.

18. In a gun control mechanism, the combination with a servo-motor mechanism for controlling the rate and direction of gun movement including a servo-valve, of means for actuating said valve in accordance with the rate and direction of movement of a remotely located director, a servo-motor, a pair of channels coupling the servo-valve to the motor, a stop valve located in one of said channels having a pair of ports to which the respective parts of the channel are connected, a valve plunger for normally interconnecting said ports, means to shift said plunger to close one of said ports and thereby stop the motor, and check valve means effective to by-pass said closed port upon reversal of the direction of flow in said channel.

19. In a gun control mechanism, the combination with a gun and a remotely located director, of motion transmitting means coupling the director for movement of a gun including a variable speed hydraulic unit coupled for actuation of the gun and a servo-motor mechanism for controlling the rate and direction of said unit including a servo-valve, and a motor, a pair of channels extending from the valve to the motor, a stop valve located in one of said channels and having a pair of ports connected to the respective parts of said channel, a plunger in said valve having a central position for interconnecting said ports, a feed back mechanism from the gun including a dog wheel and trip dogs carried by the wheel for shifting said valve in one direction or the other from its central position to close one or the other of said ports to stop movement of the gun in a given direction, means to reverse the direction of flow in said motor channels to cause an opposite direction of movement of the gun, and means in the stop valve to automatically by-pass said closed port to cause said gun movement, whereby the feed back mechanism will withdraw said trip dog and permit manual setting of the stop valve in its running position.

20. In a gun control mechanism, the combination with a gun and a remotely located continuously moving director, of motion transmitting means for coupling the gun for automatic control by said director, said gun having a definite loading position, manually operable means for interrupting continuous movement of the gun under control of the director and causing movement toward the loading position, trip operable means for stopping the gun when it has reached said loading position, and means automatically effective when said manually operable means recouples the director for control of the gun for automatically synchronizing the gun both as to phase and amplitude with the motion of the director.

21. In a gun control mechanism, the combination with a servo-motor mechanism for controlling the rate and direction of gun movement including a servo-valve and motor, means for actuating said valve in accordance with the rate and direction of movement of a remotely located director to cause similar movement of the motor, a pair of channels coupling the servo-valve to its motor, a stop valve located in one of said channels and including a first means for permitting two-way flow in said channel whereby the operation of said motor will not be interfered with; a second means for permitting flow to the motor but stopping return flow; and a third means for permitting return flow from but stopping flow to the motor, and a manually operable device for selecting the means to be effective.

22. In a gun control mechanism, the combination with a servo-motor mechanism for controlling the rate and direction of gun movement including a servo-valve and motor, a remotely located director, means for actuating said servo-valve in accordance with the rate and direction of movement of the director for causing operation of said motor at a corresponding rate and direction, a pair of channels permitting flow from the servo-valve to the motor and thereby coupling the servo-valve to the motor, and means to stop the motor at will including a second valve shiftable in one direction to stop flow to the motor and in another direction to stop flow from the motor, and means to shift said second mentioned valve in accordance with the direction of the existing flow in the channels to stop said motor.

23. In a gun control mechanism, the combination of means for deriving motion from a constantly oscillating director and transmitting it to a receiver, a servo-motor control valve, means for translating oscillatory movement of the receiver into rectilinear oscillatory movement of the valve, a variable speed hydraulic unit geared to a gun and having a rate and direction controller, a servo-motor for actuating said controller, means coupling said motor to the servo-valve whereby said controller will be oscillated to cause oscillatory movement of the gun, a feed back mechanism from the gun including a connection to the servo-valve, a position matching mechanism having independent connections to the director, and gun for deriving the motions thereof, and determining amplitude differences therebetween, and means for applying corrections to the feed back connection to the servo-valve to maintain the desired amplitude of gun movement.

24. In a continuous aim control mechanism for a gun mounted on an unstable support having continuous substantially sinusoidal motion, the combination with a gyroscopically balanced director adapted to be held continuously aimed on a target, of means to pick up the phase and amplitude of said sinusoidal motion and transmit the same to the gun in corrected amplitude and substantially opposite phase including a self-synchronous transmitter and receiver, a servo-motor mechanism including a servo-valve, hydraulic amplification means for transmitting oscillatory movement of the receiver to the valve, and a variable speed hydraulic unit coupled to the gun and having a rate and direction controller oscillated by the servo-motor.

25. In a continuous aim control mechanism, the combination with a director and a gun, of a speed-matching mechanism for transmitting motion from the director to the gun, a position-matching mechanism coupled in parallel with the speed-matching mechanism to the director and gun, said position-matching mechanism including means to detect phase and amplitude differences between the motion of the director and gun and automatically imparting the necessary corrections to the speed-matching mechanism, a master control system including means for assuming control of gun movement independently of the speed-matching mechanism when a substantial difference in phase exists between the director and gun whereby the gun may be immediately synchronized with the director, and means for automatically transferring control to the speed-matching mechanism when substantial synchronism has been effected.

26. In a continuous aim control mechanism, the combination with a gyroscopically balanced director and gun, of a speed-matching mechanism for continuously transmitting motion from the director to the gun, a position-matching mechanism coupled in parallel with the speed-matching mechanism to the director and gun, and having operative connections to the speed-matching mechanism for maintaining the motion of the gun in correct phase and amplitude relation to the motion of the director whereby the gun will be continuously aimed on the target, and a master control system for automatically assuming control of gun movement whenever a substantial positional difference exists between the director and gun.

27. In a continuous aim control mechanism, the combination with a gyroscopically balanced director and gun, of a speed-matching mechanism for continuously transmitting motion from the director to the gun, a position-matching mechanism coupled in parallel with the speed-matching mechanism to the director and gun, and having operative connections to the speed-matching mechanism for maintaining the motion of the gun in correct phase and amplitude relation to the motion of the director, whereby the gun will be continuously aimed on the same target as the director, a master control system for automatically assuming control of gun movement whenever a substantial positional difference exists between the director and gun, and means for automatically transferring control to the speed-matching mechanism when positional agreement between the director and gun has been approximately effected.

28. In a mechanism for maintaining a gun trained on a target regardless of constant movement of a supporting ship including a director, gyroscopic means for maintaining the director trained on a target, power operable means for actuating the gun, means controlled by relative movement between the director and supporting ship for controlling said power operable means and causing relative movement between the gun and ship, a position matching means having co-operating portions, the relative positions of which are determined independently by the rate of relative movement between the gun and ship and between the director and ship respectively, and means responsive to a differential positioning of said portions to change the effect of said power operable means.

29. In a continuous aim control mechanism for a gun mounted on an unstable support, said gun being adjustable in train and in elevation, the combination with a gyroscopically balanced director carried by said support, of means for imparting variations in relative movement between the support and director both in train and in elevation including a first power transmission connected to the training mechanism of the gun and a second power transmssion connected to the elevating mechanism of the gun, means for connecting each of said transmissions to the director for independent control thereof, each transmission including a position matching mechanism having a first matching member directly controlled from the director and a second matching member connected to the feed back mechanism of the respective training and elevating mechanisms of the gun, means in each transmission controlled by the respective position matching mechanisms for correcting for phase and amplitude differences between the train and elevating motions of the director as respects those of the gun and a parallax compensating mechanism in the feed back mechanism from the training mechanism of the gun for applying trunnion tilt corrections.

30. In a mechanism for maintaining a gun supported by a constantly oscillating ship trained on a given target, the combination with a hydraulic variable speed gear connected with the gun for actuation thereof, of power means for effecting adjustment of said variable speed gear, a controller for said power means, a director carried by and responsive to continuous movement of the ship, a transmission train extending from said director to said controller for adjustment thereof to effect therethrough a rate and direction of movement of the gun by the hydraulic variable speed unit corresponding to the rate and direction of movement of the director, a position matching mechanism having portions responsive to actual movement of the gun and of the director, and means operable by said mechanism for effecting a compensating adjustment of the controller, eliminating time lag in the transmission system to insure actual synchronous movements of gun and director.

31. In a gun control mechanism, the combination with a gun, of a hydraulic variable speed unit for effecting movement thereof, a controller for determining the rate and direction of actuation of the gun by the unit, a means for adjusting said controller including a director, a power transmission train coupling the director to the controller for directing movement of the gun in accordance with movements of the director, means independent of said train for continuously measuring the difference in phase between actual movements of the gun and director, and corrective means coupled with the controller and responsive to said phased differences for modifying the reaction of the controller on the hydraulic variable speed unit whereby the actual rates of movement of the gun and director are synchronous.

32. A control mechanism for effecting aiming adjustments of a gun or the like in accordance with sighting adjustments of a director, including a single hydraulic variable speed gear individual to the gun and a hydraulically actuated controller for adjusting said gear to determine the rate and direction of movement of the gun thereby, and means for determining the effect of said controller including a first director controlled hydraulic circuit reacting on said controller, a position matching mechanism including elements individual to the director and the controlled gun, and a supplemental hydraulic circuit controlled by out-of-phase relationship between the position matching elements of the director and gun superimposing a corrective action on the first hydraulic circuit for modifying the director determined adjustment thereof.

33. A control mechanism for effecting aiming adjustments of a gun or the like in accordance with sighting adjustments of a director, including a single hydraulic variable speed gear individual to the gun and a hydraulically actuated controller for adjusting said gear to determine the rate and direction of movement of the gun thereby, and means for determining the effect of said controller including a first director controlled hydraulic circuit reacting on said controller, a position matching mechanism including elements individual to the director and the controlled gun, a supplemental hydraulic circuit controlled by out-of-phase relationship between the position matching elements of the director and gun superimposing a corrective action on the first hydraulic circuit for modifying the director determined adjustment thereof, and reactance means coupling the adjustable element of the variable speed unit and the controller, substantially as and for the purpose described.

34. A control mechanism for effecting aiming adjustments of a gun or the like in accordance with sighting adjustments of a director, including a single hydraulic variable speed gear individual to the gun and a hydraulically actuated controller for adjusting said gear to determine the rate and direction of movement of the gun thereby, and means for determining the effect of said controller including a first director controlled hydraulic circuit reacting on said controller, a position matching mechanism including elements individual to the director and the controlled gun, and a supplemental hydraulic circuit controlled by out-of-phase relationship between the position matching elements of the director and gun superimposing a corrective action on the first hydraulic circuit for modifying the director determined adjustment thereof, said director operating means for the controller including a free floating hydraulic pressure differentiator and electrical transmission means associated with the director for determining the effect of said differentiator.

35. In a mechanism of the character described, the combination with a movable director and a gun adapted to be moved in synchronism therewith, of a variable speed unit for effecting movement of the gun, a controller therefor, a first transmission system extending from the director to the controller including a hydraulic pressure differentiator, said system determining the approximate rate and ultimate positioning of the gun by the variable speed unit, a position-matching mechanism including feed back elements respectively from the gun and director including a hydraulic pressure differentiator for imposing a supplemental corrective effect on the controller whereby the movement of the director and gun are properly synchronous.

36. In a mechanism of the character described, the combination with a movable director and a gun adapted to be moved in synchronism therewith, of a variable speed unit for effecting movement of the gun, a controller therefor, a first transmission system extending from the director to the controller including a hydraulic pressure differentiator, said system determining the approximate rate and ultimate positioning of the gun by the variable speed unit, and a position-matching mechanism including feed back elements respectively from the gun and director including a hydraulic pressure differentiator for imposing a supplemental corrective effect on the controller whereby the movement of the director and gun are properly synchronous, said feed back mechanism including an automatic parallax corrector.

37. In a mechanism of the character described, the combination with a movable director and a gun adapted to be moved in synchronism therewith, of a variable speed unit for effecting movement of the gun, a controller therefor, a first transmission system extending from the director to the controller including a hydraulic pressure differentiator, said system determining the approximate rate and ultimate positioning of the gun by the variable speed unit, a position-matching mechanism including feed back elements respectively from the gun and director including a hydraulic pressure differentiator for imposing a supplemental corrective effect on the controller whereby the movement of the director and gun are properly synchronous, said feed back mechanism including an automatic parallax corrector, and means for variably setting said corrector in accordance with the separation of the director and gun.

38. In a mechanism of the character described, the combination with a movable director and a gun adapted to be moved in synchronism therewith, of a variable speed unit for effecting movement of the gun, a controller therefor, a first transmission system extending from the director to the controller including a hydraulic pressure differentiator, said system determining the approximate rate and ultimate positioning of the gun by the variable speed unit, a position-matching mechanism including feed back elements respectively from the gun and director including a hydraulic pressure differentiator for imposing a supplemental corrective effect on the controller whereby the movement of the director and gun are properly synchronous, said feed back mechanism including an automatic parallax corrector, and means for variably setting said corrector to compensate for changes in range.

39. In a mechanism of the character described, the combination with a movable director and a gun adapted to be moved in synchronism therewith, of a variable speed unit for effecting movement of the gun, a controller therefor, a first transmission system extending from the director to the controller including a hydraulic pressure differentiator, said system determining the approximate rate and ultimate positioning of the gun by the variable speed unit, a position-matching mechanism including feed back elements respectively from the gun and director including a hydraulic pressure differentiator for imposing a supplemental corrective effect on the controller whereby the movement of the director and gun are properly synchronous, said feed back mchanism including an automatic parallax corrector, means for variably setting said corrector in accordance with the separation of the director and gun, and additional means for variably moving the automatic action of the corrector in accordance with changes in range.

40. In a mechanism for controlling the movement of a gun from a remotely located director, the combination with a power adjustable variable speed mechanism for effecting said movement, of a control transmission train including a first portion synchronously operated by the director and terminating in a control member, a second portion operatively connected to said first mentioned portion for having its rate of movement determined by said control member to adjust said power adjustable variable speed mechanism, independent means for measuring positional differences between the director and gun, and means actuated thereby for applying a correction to said control member whereby the rate of the power adjustable variable speed mechanism will be varied relative to the director determined adjustment thereof to synchronize the actual movements of the gun and director.

HANS ERNST.
AMOS H. HAWLEY.

References Cited in the file of this patent

UNITED STATES PATENTS

| Number | Name | Date |
|---|---|---|
| 924,787 | Janney | June 15, 1909 |
| 1,296,303 | Manly | Mar. 4, 1919 |
| 1,299,509 | Rey | Apr. 8, 1919 |
| 1,308,550 | Manly | July 1, 1919 |
| 1,360,664 | Miller | Nov. 30, 1920 |
| 1,387,678 | Anderson | Aug. 16, 1921 |
| 1,436,280 | Minorsky | Nov. 21, 1922 |
| 1,472,885 | Perham | Nov. 6, 1923 |
| 1,481,645 | Kaminski | Jan. 22, 1924 |
| 1,530,445 | Warren | Mar. 17, 1925 |
| 1,559,566 | Farrell et al. | Nov. 3, 1925 |
| 1,788,670 | Granat | Jan. 13, 1931 |
| 2,404,127 | Ernst | July 16, 1946 |

FOREIGN PATENTS

| Number | Country | Date |
|---|---|---|
| 350,955 | Great Britain | June 11, 1931 |